US012801972B2

(12) United States Patent
Amaro Fernandez et al.

(10) Patent No.: US 12,801,972 B2
(45) Date of Patent: Nov. 17, 2026

(54) QUANTUM COMPUTING SYSTEM AND METHOD FOR ERROR DETECTION

(71) Applicant: Quantinuum Ltd, London (GB)

(72) Inventors: David Amaro Fernandez, London (GB); Christopher Self, London (GB); Marcello Benedetti, London (GB); Kentaro Yamamoto, London (GB)

(73) Assignee: Quantinuum Ltd, London (GB)

( * ) Notice: Subject to any disclaimer, the term of this patent is extended or adjusted under 35 U.S.C. 154(b) by 23 days.

(21) Appl. No.: 19/129,148

(22) PCT Filed: Nov. 13, 2023

(86) PCT No.: PCT/GB2023/052963
§ 371 (c)(1),
(2) Date: May 12, 2025

(87) PCT Pub. No.: WO2024/100423
PCT Pub. Date: May 16, 2024

(65) Prior Publication Data

US 2026/0161994 A1 Jun. 11, 2026

(30) Foreign Application Priority Data

Nov. 12, 2022 (GB) .................................... 2216908
Nov. 15, 2022 (GB) .................................... 2217060
Jun. 29, 2023 (GB) .................................... 2309931

(51) Int. Cl.
*G06N 10/70* (2022.01)

(52) U.S. Cl.
CPC .................................. *G06N 10/70* (2022.01)

(58) Field of Classification Search
None
See application file for complete search history.

(56) References Cited

U.S. PATENT DOCUMENTS 12,566,991 B1 * 3/2026 Mladenov .............. G06N 10/20
2020/0274554 A1 8/2020 Aspuru-Guzik et al.
(Continued)

OTHER PUBLICATIONS

Chao et al., "Flag Fault-Tolerant Error Correction for any Stabilizer Code"; PRX Quantum 1, 010302; Sep. 2020; 6 pages.
(Continued)

*Primary Examiner* — Mujtaba M Chaudry
(74) *Attorney, Agent, or Firm* — Daly, Crowley, Mofford & Durkee, LLP

(57) ABSTRACT

A quantum computing system and a method for quantum error detection are disclosed, for performing a quantum operation with fault tolerance provided by detectability of specific logical errors during initialisation, syndrome measurement and state measurement, but without computationally intensive quantum error correction. A quantum circuit of logical qubits is converted into a set of instructions for performing a quantum circuit of physical qubits. The set of instructions comprises a plurality of blocks of instructions and each block of instructions comprises at least one instruction for performing at least one quantum gate on a n qubit quantum circuit by a quantum computing system. The quantum computing system performs fault-tolerant initialisation of a logical state of k logical qubits using an n qubit quantum circuit and a first ancilla and the quantum error detection code, and performs each instruction block of the plurality of instruction blocks on the quantum circuit of n physical qubits. After each instruction block, the quantum computing system performs a fault-tolerant syndrome measurement of stabilizers on the n physical qubits using the first ancilla and a second ancilla respectively. After all instruction blocks of the plurality of instruction blocks have been applied to the n physical qubits, the quantum computing system performs a fault-tolerant state measurement, using the first and second ancilla, of each logical operator of
(Continued)

formula (I) by measuring the n physical qubits. During any of the fault-tolerant steps of performing initialisation, syndrome measurement or state measurement, we discard the computer results and restart the computation of the quantum operation if any measurement of the first or second ancilla indicates a fault.

16 Claims, 23 Drawing Sheets

(56) References Cited

U.S. PATENT DOCUMENTS

| | | | | |
|---|---|---|---|---|
| 2021/0406753 | A1* | 12/2021 | Mosca | G06F 30/20 |
| 2022/0198312 | A1 | 6/2022 | Delfosse et al. | |
| 2023/0186139 | A1* | 6/2023 | Sawaya | G06N 10/40 714/1 |
| 2023/0244459 | A1* | 8/2023 | Zou | G06F 8/447 717/140 |

OTHER PUBLICATIONS

Chao et al., "Quantum Error Correction with Only Two Extra Qubits"; Phys. Rev. Letters 121, 050502; Aug. 2018; 7 pages.
Gottesman, An Introduction to Quantum Error Correction and Fault-Tolerant Quantum Computation; Proceedings of Symposia in Applied Mathematics; Apr. 2009; 45 pages.
Harrow et al., "Quantum algorithm for linear systems of equations"; arXiv:0811.3171v3; Sep. 2009; 15 pages.
Harrow et al., "Quantum Computational Supremacy"; arXiv:1809.07442v1; Sep. 2018; 15 pages.
Acharya et al., "Suppressing quantum errors by scaling a surface code logical qubit"; accessible online at: https://doi.org/10.1038/s41586-022-05434-1; Feb. 2023; 7 pages.
Allcock et al., "The Prospects of Monte Carlo Antibody Loop Modeling on a Fault-Tolerant Quantum Computer"; Frontiers in Drug Discovery, vol. 2, Article 908870; Jul. 2022; 8 pages.
Amaro et al., "Filtering variational quantum algorithms for combinatorial optimization"; Quantum Science and Technology, 7, 015021; Feb. 2021; 18 pages.
Baldwin et al., "Re-examining the quantum volume test: Ideal distributions, compiler optimizations, confidence intervals, and scalable resource estimations"; arXiv:2110.14808v3; May 2022; 29 pages.
Benedetti et al., "Parameterized quantum circuits as machine learning models"; Quantum Science and Technology, 5, 019601; Dec. 2019; 20 pages.
Bruzewicz et al., "Trapped-Ion Quantum Computing: Progress and Challenges"; arXiv:1904.04178v1; Apr. 2019; 56 pages.
Chen et al., "Exponential suppression of bit or phase errors with cyclin error correction"; accessible online at: https://doi.org/10.1038/s41586-021-03588-y; Jul. 2021; 6 pages.
Cirac et al., "Goals and opportunities in quantum simulation"; Nature Physics, vol. 8; Apr. 2012; 3 pages.
Cross et al., "Validating quantum computers using randomized model circuits"; Phys. Rev. A 100, 032328; Sep. 2019; 13 pages.
Quantinuum.com; accessible online at: https://www.quantinuum.com/; accessed: Jun. 5, 2025; 3 pages.
Farhi et al., "A Quantum Approximate Optimization Algorithm"; arXiv:1411.4028v1; Nov. 2014; 16 pages.
Gidney et al., "How to factor 2048 bit RSA integers in 8 hours using 20 million noisy qubits"; arXiv:1905.09749v3; Apr. 2021; 31 pages.
Gokhale et al., "Quantum Fan-out: Circuit Optimizations and Technology Modeling"; arXiv:2007.04246v1; Jul. 2020; 14 pages.
Grassl et al., "On optimal quantum codes"; ERATO Conference on Quantum Information Science; 2003; 10 pages.
Hines et al., "Demonstrating Scalable Randomized Benchmarking of Universal Gate Sets"; Physical Review X 13, 041030; Nov. 2023; 38 pages.
Itoko et al., "Scheduling of Operations in Quantum Compiler"; arXiv:2011.04936v1; Nov. 2020; 8 pages.
Knill, "Fault-Tolerant Postselected Quantum Computation: Schemes"; arXiv:quant-ph/040217v1; Feb. 2004; 17 pages.
Knill, "Fault-Tolerant Postselected Quantum Computation: Threshold Analysis"; arXiv:quant-ph/0404104v1; Apr. 2004; 21 pages.
Lao et al., "2QAN: A quantum compiler for 2-local qubit Hamiltonian simulation algorithms"; arXiv:2108.02099v2; Nov. 2021; 17 pages.
Linke et al., "Fault-tolerant quantum error detection"; Science Advances; Oct. 2017; 6 pages.
Lund et al., "Quantum sampling problems, BosonSampling and quantum supremacy"; npj Quantum Information; Apr. 2017; 8 pages.
Molmer et al., "Multi-particle entanglement of hot trapped ions"; arXiv:quant-ph/9810040v2; Jan. 1999; 4 pages.
Nannicini et al., "Optimal qubit assignment and routing via integer programming"; arXiv:2106.06446v3; Jul. 2021; 29 pages.
Pino et al., "Demonstration of the trapped-ion quantum CCD computer architecture"; arXiv:2003.01293v4; Apr. 2021; 11 pages.
Postler et al., "Demonstration of fault-tolerant universal quantum gate operations"; arXiv:2111.12654v3; Nov. 2022; 14 pages.
Proctor et al., "Scalable Randomized Benchmarking of Quantum Computers Using Mirror Circuits"; Phys. Rev. Letters 129, 150502; Oct. 2022; 7 pages.
Proctor et al., "Measuring the Capabilities of Quantum Computers"; arXiv:2008.11294v2; Jan. 2022; 30 pages.
Pytket Python Package; accessible online at: https://pypi.org/project/pytket/Pytket-Quantinuum; accessed: Jun. 5, 2025; 2 pages.
Qiskit Python Package; accessible online at: https://pypi.org/project/qiskit/ ; accessed: Jun. 5, 2025; 2 pages.
Ryan-Anderson et al., "Realization of Real-Time Fault-Tolerant Quantum Error Correction"; Physical Review X 11, 041058; Dec. 2021; 29 pages.
Ryan-Anderson et al., "Implementing Fault-tolerant Entangling Gates on the Five-qubit Code and the Color Code"; arXiv:2208.01863v1; Aug. 2022; 17 pages.
Schindler et al., "A quantum information processor with trapped ions"; New Journal of Physics, 15; Dec. 2013; 37 pages.
Self et al., "Protecting Expressive Circuits with a Quantum Error Detection Code"; arXiv:2211.06703v2; Jul. 2024; 16 pages.
Shor, "Algorithms for Quantum Computation: Discrete Logarithms and Factoring"; Proceedings 35th Annual Symposium on Foundations of Computer Science; Nov. 1994; 11 pages.
Sivarajah et al., "t|ket>: A Retargetable Compiler for NISQ Devices"; arXiv:2003.10611v3; Apr. 2020; 43 pages.
Stricker et al., "Deterministic correction of qubit loss"; arXiv:2002.09532v1; Feb. 2020; 13 pages.
Suzuki et al., "Quantum Error Mitigation as a Universal Error Reduction Technique: Applications from the NISQ to the Fault-Tolerant Quantum Computing Eras"; PRX Quantum 3, 010345; Mar. 2022; 33 pages.
Urbanek et al., "Error detection on quantum computers improves accuracy of chemical calculations"; arXiv:1910.00129v2; Jun. 2021; 8 pages.
Van de Wetering, "Constructing quantum circuits with global gates"; New Journal of Physics, 23; Apr. 2021; 13 pages.
Chao et al., "Fault-tolerant quantum computation with few qubits"; arXiv:1705.05365v1; May 2017; 10 pages.
Chamberland et al., "Very low overhead fault-tolerant magic state preparation using redundant ancilla encoding and flag qubits"; arXiv:2003.03049v1; Mar. 2020; 27 pages.
Cramer et al., "Repeated quantum error correction on a continuously encoded qubit by real-time feedback"; arXiv:1508.01388v2; Apr. 2016; 23 pages.
International Search Report and Written Opinion dated Feb. 13, 2024, for International Patent Application No. PCT/GB2023/052963; 12 pages.
UKIPO Search Report under Section 17 dated Dec. 15, 2023, for UK Patent Application No. GB2216908.0; 1 page.
UKIPO Search Report under Section 17 dated May 21, 2024, for UK Patent Application No. GB2309931.0; 1 page.

* cited by examiner

QUANTUM COMPUTING SYSTEM AND METHOD FOR ERROR DETECTION

This application is a National Stage Entry of International Application No. PCT/GB2023/052963, which was filed on Nov. 13, 2023, which claims the benefit of GB Patent Application No. 2216908.0, filed on Nov. 12, 2022, GB Patent Application No. 2217060.9, filed on Nov. 15, 2022, and GB Patent Application No. 2309931.0, filed on Jun. 29, 2023. All these applications are hereby incorporated by reference herein in their entirety.

TECHNICAL FIELD

The present disclosure relates to a quantum computing system, for example to a hybrid computing apparatus including a combination of a classical binary computer coupled to a quantum computer. Moreover, the present disclosure relates to a method for operating the quantum computing system, where operations are prepared by a classical computer and quantum operations are performed by a quantum computer. Furthermore, the present disclosure relates to software products recorded on machine-readable media, wherein the software products include program code which is executable to control operation of a quantum computing system.

BACKGROUND

A longstanding problem in the development of quantum computers has been how to maintain quantum performance (such as maintaining quantum coherence) in the face of noise affecting the devices for carrying out the quantum computation such that faults occur in the processing. Quantum computers have recently become available as noisy intermediate scale quantum (NISQ) devices, and quantum computers have been simulated using classical computers. A technical problem associated with NISQ devices is that the number of available qubits limits the available resources that can be assigned to protocols for mitigating the effects of errors, that arise due to the presence of noise.

Various methods have been proposed in published scientific literature for detecting and then correcting errors arising when performing computations on NISQ devices. However, although quantum error correction has been identified as essential for fault-tolerance by some authors, typical NISQ devices are not advanced enough to continuously implement resource-intensive quantum error correction to achieve fully fault-tolerant systems. The traditional definition of fault-tolerance is that a fault-tolerant circuit is a circuit where there is no single component whose failures produces an undetecable logical error. Traditionally, errors are characterised as unintended single qubit Pauli gates which are detected and corrected in order to maintain the quantum performance of a noisy quantum computer. Existing quantum computers can only implement quantum error correction protocols on very few logical qubits and simple states due to limitations in the scalability and accuracy of NISQ devices. Therefore quantum algorithms have to be carefully constructed taking into account these limitations.

SUMMARY OF THE DISCLOSURE

The present disclosure seeks to provide a technical solution to a technical problem of implementing resource-intensive protocols for mitigating the effects of errors on NISQ devices that have limited available resources. An aim of the present disclosure is to provide an improved and resource-efficient method of detecting when errors occur when executing quantum computations using a quantum computing system which may consist of a classical computer and a quantum computer. A first method involves efficient error detection combined with efficient rejection of errors (this may involve simply discarding the result of a failed quantum circuit execution instance) and enabling the quantum computations to be repeated until an acceptable accuracy in the quantum computations is achieved. This can avoid the need for computationally expensive error correction, at least for quantum computing systems with high quality physical qubits, such as existing ion-trapped quantum computers. Moreover, an aim of the present disclosure is to provide a technical solution of an improved quantum computing system, comprising a classical computer and a quantum computer, that implements the improved methods of detecting and rejecting errors which occur when executing quantum computations on quantum hardware.

The inventors of the present invention have determined that detecting and efficiently rejecting quantum computational errors can provide a practically useful level of fault tolerance, with better computational efficiency than known methods of performing both error detection and correction. The present invention provides for an encoding from logical qubits in a quantum circuit to actual physical qubits that allows for quantum error detection through measurements on the physical qubits. Efficient discarding of the erroneous partial results followed by re-starting the quantum computation, is found to be an efficient way to handle an identified error. This can provide an adequate level of quantum performance in the presence of noise, especially when executing on a quantum computing system using high quality quantum circuits based on ion-traps, and especially when initialisation and syndrome measurement are fault-tolerant steps.

In some implementations, a fault-tolerant initialisation involves an even number k of logical qubits being encoded into $n=k+2$ physical qubits, for any even $k\geq 2$. In some other implementations, an odd number k of logical qubits is encoded onto an even number of physical qubits including a redundant qubit d, which is then used for circuit optimisation. Then logical operators act on the qubits without fault tolerance. This is followed by fault-tolerant syndrome measurement using two ancillas, and fault-tolerant measurement of all qubits. This process can detect single qubit errors with an overhead of only four qubits; and the circuits are fault-tolerant in the sense that single faults do not give rise to undetectable logical errors. The invention has the potential to cause a quantum computer or a hybrid quantum-classical computer system to operate more reliably as well as more efficiently. Moreover, efficient detecting and discarding of computational errors can be implemented in combination with enabling quantum computations to be repeated until the quantum computational errors are below an error threshold.

The current invention trades off the ability to perform every operation fault tolerantly in exchange for a reduced requirement for quantum resources. Instead of performing every operation fault tolerantly, some steps are left to be performed without fault tolerance. This provides a problem of how to choose which operations should be left to be not fault tolerant. The non-fault tolerant operations may be implemented using a universal gate set of logical quantum gates. The inventors have appreciated that the choice of the "Iceberg" code for the error detection code allows for an advantage when implemented on a device that has all-to-all connectivity between physical qubits and high fidelity two-qubit interactions such as in trapped-ion quantum computers. Additionally, trapped ion systems are generally better at performing mid circuit measurement and re-initialization of qubits, which is used for performing the syndrome extraction operation during the logical computation. In turn, mid-circuit syndrome extraction is proven to be practically and not only theoretically, beneficial, as it reduces the effect of noise.

Provided is a method of performing a quantum computing operation with quantum error detection. A quantum error detection code is used to convert an operation defined by k logical qubits into a set of instructions for performing a quantum circuit of n physical qubits where n=k+2, wherein the quantum error detection code encodes the k logical qubits into the n physical qubits with stabilisers on the physical qubits, and with first and second ancilla qubits used for error detection. The method includes: performing, by a quantum computing system, fault-tolerant initialisation of a logical state of k logical qubits using an n qubit quantum circuit and a first ancilla and the quantum error detection code; performing, by the quantum computing system, the instructions on the quantum circuit of n physical qubits to perform a computation; performing, by the quantum computing system, a fault-tolerant syndrome measurement of the stabilisers on the n physical qubits using the first ancilla and the second ancilla; performing, by the quantum computing system, a fault-tolerant state measurement of each logical operator using the first and second ancilla by measuring the n physical qubits; and discarding the computation of the quantum circuit and restarting the computation of the quantum operation in response to either the syndrome measurement or state measurement of the first or second ancilla indicating a fault.

According to a first aspect of the invention, there is provided a method of performing a quantum operation comprising a target unitary operation with quantum error detection, the method comprising:

- obtaining a finite gate decomposition approximation of the target unitary for a quantum circuit of k logical qubits;
- converting, using an quantum error detection code, the finite gate decomposition for a quantum circuit of k logical qubits into a set of instructions for performing a quantum circuit of n physical qubits wherein n=k+2 and wherein the n physical qubits comprise a physical qubit t and a physical qubit b, wherein the quantum error detection code encodes the k logical qubit into the n physical qubits and is a stabiliser code comprising two stabilisers on the n physical qubits:

$$S_X = X_t X_b \otimes_{q=1}^{k} X_q$$

$$S_Z = Z_t Z_b \otimes_{q=1}^{k} Z_q$$

and the logical qubits operators, $\overline{Z_J}$ of the code are defined by:

$$\overline{X_q} = X_t X_q \text{ for } q = 1, \ldots, k$$

$$\overline{Z_q} = Z_b Z_q \text{ for } q = 1, \ldots, k$$

wherein $\overline{X_q}$, $\overline{Z_q}$ are the Pauli X and Z single logical qubit operators on logical qubit q, wherein the set of instructions comprises a plurality of blocks of instructions and wherein each block of instructions comprises at least one instruction for performing at least one quantum gate on a n qubit quantum circuit by a quantum computing system; performing, by the quantum computing system, fault-tolerant initialisation of a logical state of k logical qubits using an n qubit quantum circuit and a first ancilla and the quantum error detection code; performing, by the quantum computing system, each instruction block of the plurality of instruction blocks on the quantum circuit of n physical qubits; after each instruction block, performing, by the quantum computing system, a fault-tolerant syndrome measurement of the $S_Z$ stabiliser and the $S_X$ stabiliser on the n physical qubits using the first ancilla and a second ancilla respectively; after all instruction blocks of the plurality of instruction blocks have been applied to the n physical qubits, performing, by the quantum computing system, a fault-tolerant state measurement, using the first and second ancilla, of each logical operator $\overline{Z_q}\forall q=\{1, \ldots, k\}$ by measuring the n physical qubits; and during any of the fault-tolerant steps of performing initialisation, syndrome measurement or state measurement to discard the computer results and to restart the computation of the quantum operation based on any measurement of the first or second ancilla indicating a fault.

A circuit or operation performed by a circuit is fault-tolerant if the circuit is one where there is no single component whose failure produces an undetecable logical error.

The quantum circuit of the syndrome measurement may be based on the quantum error detection code. The quantum circuit of the initialisation may be based on the quantum error detection code. The quantum circuit of the state measurement may be based on the quantum error detection code.

Preferably, the quantum computing system is a trapped-ion quantum computer with all-to-all connectivity between qubits.

Preferably, the finite gate decomposition is composed of unitary gates from a universal gate set which comprises gates which can be encoded onto the physical qubits using only two-qubit Mølmer-Sørensen gates and up to four Clifford group gates and, optionally, the universal gate set comprises global rotations on k or k−1 logical qubits.

Preferably, the universal gate set only comprises single-qubit logical rotations, two-qubit logical rotations and global rotations on k or k−1 logical qubits.

Preferably the fault-tolerant measurement of each logical operator $\overline{Z_q}\forall q$ is combined with the last syndrome measurement after the last instruction block has been applied by measuring the $S_X$ stabiliser on the n physical qubits and measuring the n physical qubits and post-processing the results to decode the $S_z$ stabiliser and each logical operator $\overline{Z_q}$ and the quantum computing system is configured to discard the computer results and to restart the computation of the quantum operation based on the decoded $S_z$ stabiliser value indicating a fault during the fault tolerant steps.

According to a second aspect of the invention, there is provided a system for performing a quantum operation comprising a target unitary operation with quantum error detection, the system comprising:

- a classical computing system;
- a quantum computing system, wherein the quantum computing system comprises k physical qubits, a physical qubit t and a physical qubit b, and a first and second ancilla qubit, and wherein the quantum computing system is configured to implement a quantum circuit on the k physical qubits, the physical qubit t and the physical qubit b, using the first and second ancilla qubit;

and wherein the classical computing system is configured to:

obtain a finite gate decomposition approximation of the target unitary for a quantum circuit of k logical qubits;

convert, using an quantum error detection code, the finite gate decomposition for a quantum circuit of k logical qubits into a set of instructions for performing a quantum circuit of the n physical qubits of the quantum computing system, wherein the quantum error detection code encodes the k logical qubits into the n physical qubits and is a stabiliser code comprising two stabilisers on the physical qubits:

$$S_X = X_t X_b \otimes_{q=1}^{k} X_q$$

$$S_Z = Z_t Z_b \otimes_{q=1}^{k} Z_q$$

and the logical qubits operators, $\overline{Z_J}$ of the code are defined by:

$$\overline{X_q} = X_t X_q \text{ for } q = 1, \ldots , k$$

$$\overline{Z_q} = Z_b Z_q \text{ for } q = 1, \ldots , k$$

wherein $\overline{X_q}$, $\overline{Z_q}$ are the Pauli X and Z single logical qubit operators on logical qubit q, wherein the set of instructions comprises a plurality of blocks of instructions and wherein each block of instructions comprises at least one instruction for performing at least one quantum gate on a n qubit quantum circuit by the quantum computing system; and transmit the set of instructions to the quantum computing system;

and wherein the quantum computing system is configured to:

receive the set of instructions:

perform fault-tolerant initialisation of a logical state of k logical qubits using an n qubit quantum circuit and a first ancilla and the quantum error detection code;

perform each instruction block of the plurality of instruction blocks on the quantum circuit of n physical qubits;

after each instruction block, perform a fault-tolerant syndrome measurement of the $S_Z$ stabiliser and the $S_X$ stabiliser on the n physical qubits using the first ancilla and a second ancilla respectively;

after all instruction blocks of the plurality of instruction blocks have been applied to the n physical qubits, perform, a fault-tolerant state measurement, using the first and second ancilla, of each logical operator $\overline{Z_q}\forall q=\{1, \ldots, k\}$ by measuring the n physical qubits; and wherein the quantum computing system is configured to discard the computer results and to restart the computation of the quantum operation during any of the fault tolerant steps of performing initialisation, syndrome measurement or state measurement based on any measurement of the first or second ancilla indicating a fault.

Preferably, the quantum computing system is a trapped-ion quantum computer with all-to-all connectivity between qubits.

Preferably the qubits of the quantum computing system comprises only the n physical and two ancilla qubits.

Preferably, the finite gate decomposition is composed of unitary gates from a universal gate set comprises gates which can be encoded onto the physical qubits using only two-qubit Mølmer-Sørensen gates and up to four Clifford group gates and, optionally, the universal gate set comprises global rotations on k or k−1 logical qubits.

Preferably, the universal gate set only comprises single-qubit logical rotations, two-qubit logical rotations and global rotations on k or k−1 logical qubits.

Preferably, the quantum computing system is further configured to combine the fault-tolerant state measurement of each logical operator $\overline{Z_q}\forall q$ with the last syndrome measurement after the last instruction block has been applied by measuring the $S_X$ stabiliser on the n physical qubits and measuring the n physical qubits and to transmit the results to the classical computing arrangement and the classical computing arrangement is further configured to post-process the transmitted results to decode the $S_z$ stabiliser and each logical operator $\overline{Z_q}$ and to transmit an indication of the decoded $S_z$ stabiliser value to the quantum computing system, and wherein the quantum computing system is further configured to discard the computer results and to restart the computation based on the decoded $S_z$ stabiliser value indicating a fault.

According to a third aspect of the invention, there is provided a quantum computing system for performing a quantum operation comprising a target unitary operation with quantum error detection, wherein the quantum computing system comprises k physical qubits, a physical qubit t and a physical qubit b, and a first and second ancilla qubit, and wherein the quantum computing system is configured to implement a quantum circuit on the k physical qubits, the physical qubit t and the physical qubit b, using the first and second ancilla qubit, and wherein the quantum computing system is configured to:

receive a set of instructions comprising a plurality of blocks of instructions and wherein each block of instructions comprises at least one instruction for performing at least one quantum gate on an qubit quantum circuit by the quantum computing system;

perform fault-tolerant initialisation of a logical state of k logical qubits using an n qubit quantum circuit and a first ancilla and the quantum error detection code;

perform each instruction block of the plurality of instruction blocks on the quantum circuit of n physical qubits;

after each instruction block, perform a fault-tolerant syndrome measurement of the $S_Z$ stabiliser and the $S_X$ stabiliser on the n physical qubits using the first ancilla and a second ancilla respectively;

after all instruction blocks of the plurality of instruction blocks have been applied to the n physical qubits, perform, a fault-tolerant state measurement, using the first and second ancilla, of each logical operator $\overline{Z_q}\forall q=\{1, \ldots, k\}$ by measuring the n physical qubits; and wherein the quantum computing system is configured to discard the computer results and to restart the computation of the quantum operation during any of the fault tolerant steps of performing initialisation, syndrome measurement or state measurement based on any measurement of the ancilla indicating a fault.

Preferably, the at least one quantum gate on the n qubit quantum circuit of each instruction block is one of a two-qubit Mølmer-Sørensen gates or the four Clifford group gates.

Preferably, the quantum computing system is further configured to combine the fault-tolerant measurement of each logical operator $\overline{Z_q}\forall q$ with the last syndrome measurement after the last instruction block has been applied by measuring the $S_X$ stabiliser on the n physical qubits and measuring the n physical qubits, to transmit the results to a classical computing arrangement, to receive an indication of the decoded $S_z$ stabiliser value, and to discard the computer results and to restart the computation based on the decoded $S_z$ stabiliser value indicating a fault.

According to a fourth aspect of the invention, there is provided a quantum computing system including a quantum computing arrangement coupled to a classical computing arrangement, wherein the classical computing arrangement is configured to receive input data thereat and also to send output data therefrom, wherein the classical computing arrangement is configured to process at least one computational task included in the input data by generating a corresponding Ansatz defining initial values of k-qubits, and to configure a quantum circuit in the quantum computing arrangement that, when executed, acts on the k-qubits, wherein the quantum computing arrangement is configured to execute the quantum circuit commencing from the Ansatz to generate computed results for the k-qubits that are measured by the quantum computing arrangement to generate k-measured qubit values, wherein the quantum computing arrangement is configured to communicate the k-measured qubit values to the classical computing arrangement for use in further computations in the quantum computing system and/or for inclusion in the output data, characterized in that the quantum computing arrangement is configured to complement the k-qubits by e-ancilla qubits in the quantum circuit and the Ansatz;

the quantum computing arrangement is configured to include additional gates in the quantum circuit to couple via a quantum error detection function intermediate states of the k-qubits during execution of the quantum circuit to the e-ancilla qubits;

the quantum computing arrangement is configured to measure the e-ancilla qubits at completion of execution of the quantum circuit to generate measured e-ancilla qubit values;

the quantum computing system is configured to process the measured e-ancilla qubit values to determine whether an error has occurred during execution of the quantum circuit; and the quantum computing system is configured to discard the k-measured qubit values and repeat computation of the Ansatz and quantum circuit in an event that the quantum circuit has been executed with an error that is above the quantum computing error threshold.

Optionally, in the quantum computing system, there are included two e-ancilla qubits to complement the quantum circuit.

Optionally, in the quantum computing system, the error detection function is configured to generate the measured e-ancilla qubit values as a function of the intermediate states of all of the k-qubits during execution of the quantum circuit.

Optionally, in the quantum computing system, the error detection function is configured to generate the measured e-ancilla qubit values as a function of intermediate states pairs of the k-qubits during execution of the quantum circuit.

Optionally, in the quantum computing system, the error detection function is configured to generate the measured e-ancilla qubit values as a function of a sub-set of the intermediate states of the k-qubits during execution of the quantum circuit.

Optionally, in the quantum computing system, the e-ancilla qubits include X and Z qubits, wherein X is acting on all qubits $$S_X = X_t X_b \otimes_{Q=1}^{n} X_q;$$

Z is acting on all qubits $$S_Z = Z_t Z_b \otimes_{Q=1}^{n} Z_q.$$

Optionally, in the quantum computing system, the error detection function uses codes that have a property that some high weight products of logical operators reduce to low weight encoded operations. Optionally, in the quantum computing system, the error detection function includes one or more products of pairs of the k-qubits:

$$X_q^L = X_t X_q \text{ for } q = 1, \ldots, k \tag{a}$$

$$X_q^L X_{q'}^L = X_q X_{q'} \text{ for } q \neq q \text{ where } q, q' \in \{1, \ldots, k\} \tag{b}$$

$$\bigotimes_{r \neq q} X_r^L = X_q X_b \text{ for } q = 1, \ldots, k \tag{c}$$

$$\bigotimes_{r=1}^{k} X_r^L = X_t X_b \tag{d}$$

$$Z_q^L = Z_b Z_q \text{ for } q = 1, \ldots, k \tag{e}$$

$$Z_q^L Z_{q'}^L = Z_q Z_{q'} \text{ for } q \neq q' \text{ where } q, q' \in \{1, \ldots, k\} \tag{f}$$

$$\bigotimes_{r \neq q} Z_r^L = Z_t Z_q \text{ for } q = 1, \ldots, k \tag{g}$$

$$\bigotimes_{r=1}^{k} Z_r^L = Z_t Z_b \tag{h}$$

$$Y_q^L Y_{q'}^L = Y_q Y_{q'} \text{ for } q \neq q' \text{ where } q, q' \in \{1, \ldots, k\} \tag{i}$$

$$X_q^L \otimes_{r \neq q} Z_r^L = Y_t Y_q \text{ for } q = 1, \ldots, k \tag{j}$$

$$Z_q^L \otimes_{r \neq q} X_r^L = Y_q Y_b \text{ for } q = 1, \ldots, k \tag{k}$$

$$(-1)^{1+k/2} \otimes_{r=1}^{k} Y_r^L = Y_t Y_b \tag{l}$$

The above example assumes an even number k of logical qubits. However, an odd number k of logical qubits is also possible by including a redundant qubit d. In that case, some modifications are needed to equalities (c), (d), (g), (h), (J), (k), (l) to exploit the state of the qubit, d, as shown below.

$$X_q^L = X_t X_q \text{ for } q = 1, \ldots, k \tag{a}$$

$$X_q^L X_{q'}^L = X_q X_{q'} \text{ for } q \neq q \text{ where } q, q' \in \{1, \ldots, k\} \tag{b}$$

$$\bigotimes_{r \neq q} X_r^L = X_q X_b \text{ for } q = 1, \ldots, k \text{ with } |+\rangle_d^L \tag{c}$$

$$\bigotimes_{r=1}^{k} X_r^L = X_t X_b \text{ with } |+\rangle_d^L \tag{d}$$

$$Z_q^L = Z_b Z_q \text{ for } q = 1, \ldots, k \tag{e}$$

-continued $$Z_q^L Z_{q'}^L = Z_q Z_{q'} \text{ for } q \neq q' \text{ where } q, q' \in \{1, \ldots, k\} \quad \text{(f)}$$

$$\bigotimes_{r \neq q} Z_r^L = Z_t Z_q \text{ for } q = 1, \ldots, k \text{ with } |0\rangle_d^L \quad \text{(g)}$$

$$\bigotimes_{r=1}^k Z_r^L = Z_t Z_b \text{ with } |0\rangle_d^L \quad \text{(h)}$$

$$Y_q^L Y_{q'}^L = Y_q Y_{q'} \text{ for } q \neq q' \text{ where } q, q' \in \{1, \ldots, k\} \quad \text{(i)}$$

$$X_q^L \otimes_{r \neq q} Z_r^L = Y_t Y_q \text{ for } q = 1, \ldots, k \text{ with } |0\rangle_d^L \quad \text{(j)}$$

$$Z_q^L \otimes_{r \neq q} X_r^L = Y_q Y_b \text{ for } q = 1, \ldots, k \text{ with } |+\rangle_d^L \quad \text{(k)}$$

$$(-1)^{1+k/2} \otimes_{r=1}^k Y_r^L = Y_t Y_b \text{ with } |+i\rangle_d^L \quad \text{(l)}$$

According to a fifth aspect of the invention, there is provided a method of configuring a quantum computing system to provide quantum computing error detection, wherein the quantum computing system includes a quantum computing arrangement coupled to a classical computing arrangement, wherein the classical computing arrangement is configured to receive input data thereat and also to send output data therefrom, wherein the method includes:

(a) configuring the classical computing arrangement to process at least one computational task included in the input data by generating a corresponding Ansatz defining initial values of k-qubits, and configuring a quantum circuit in the quantum computing arrangement that, when executed, acts on the k-qubits;

(b) configuring the quantum computing arrangement to execute the quantum circuit commencing from the Ansatz to generate computed results for the k-qubits that are measured by the quantum computing arrangement to generate k-measured qubit values; and (c) configuring the quantum computing arrangement to communicate the k-measured qubit values to the classical computing arrangement for use in further computations in the quantum computing system and/or for inclusion in the output data, characterized in that the method further includes:

(d) configuring the quantum computing arrangement to complement the k-qubits by e-ancilla qubits in the quantum circuit and Ansatz;

(e) configuring the quantum computing arrangement to include additional gates in the quantum circuit to couple via a quantum error detection function intermediate states of the k-qubits during execution of the quantum circuit to the e-ancilla qubits;

(f) configuring the quantum computing arrangement to measure the e-ancilla qubits at completion of execution of the quantum circuit to generate measured e-ancilla qubit values;

(g) configuring the quantum computing system to process the measured e-ancilla qubit values to determine whether an error has occurred during execution of the quantum circuit; and (h) configuring the quantum computing system to discard the k-measured qubit values and repeat computation of the Ansatz and quantum circuit in an event that the quantum circuit has been executed with an error that is above the quantum computing error threshold.

Optionally, the method is implemented such that there are included two e-ancilla qubits to complement the quantum circuit.

Optionally, the method includes configuring the error detection function to generate the measured e-ancilla qubit values as a function of the intermediate states of all of the k-qubits during execution of the quantum circuit.

Optionally, the method is implemented such that the error detection function is configured to generate the measured e-ancilla qubit values as a function of pairs of the k-qubits during execution of the quantum circuit.

Optionally, the method includes configured the error detection function to generate the measured e-ancilla qubit values as a function of a sub-set of the intermediate states of the k-qubits during execution of the quantum circuit.

Optionally, the method is implemented such that the e-ancilla qubits include X and Z qubits, wherein X is acting on all qubits $$S_X = X_t X_b \otimes_{Q=1}^n X_q;$$

anu

Z is acting on all qubits $$S_Z = Z_t Z_b \otimes_{q=1}^n Z_q.$$

Optionally, the method is implemented such that the error detection function uses codes that have a property that some high weight products of logical operators reduce to low weight encoded operations.

Optionally, the method includes configuring the error detection function to include one or more products of pairs of code qubits:

$$X_q^L = X_t X_q \text{ for } q = 1, \ldots, k \quad \text{(a)}$$

$$X_q^L X_{q'}^L = X_q X_{q'} \text{ for } q \neq q' \text{ where } q, q' \in \{1, \ldots, k\} \quad \text{(b)}$$

$$\bigotimes_{r \neq q} X_r^L = X_q X_b \text{ for } q = 1, \ldots, k \quad \text{(c)}$$

$$\bigotimes_{r=1}^L X_r^L = X_t X_b \quad \text{(d)}$$

$$Z_q^L = Z_b Z_q \text{ for } q = 1, \ldots, k \quad \text{(e)}$$

$$Z_q^L Z_{q'}^L = Z_q Z_{q'} \text{ for } q \neq q' \text{ where } q, q' \in \{1, \ldots, k\} \quad \text{(f)}$$

$$\bigotimes_{r \neq q} Z_r^L = Z_t Z_q \text{ for } q = 1, \ldots, k \quad \text{(g)}$$

$$\bigotimes_{r=1}^k Z_r^L = Z_t Z_b \quad \text{(h)}$$

$$Y_q^L Y_{q'}^L = Y_q Y_{q'} \text{ for } q \neq q' \text{ where } q, q' \in \{1, \ldots, k\} \quad \text{(i)}$$

$$X_q^L \otimes_{r \neq q} Z_r^L = Y_t Y_q \text{ for } q = 1, \ldots, k \quad \text{(j)}$$

$$Z_q^L \otimes_{r \neq q} X_r^L = Y_q Y_b \text{ for } q = 1, \ldots, k \quad \text{(k)}$$

$$(-1)^{1+k/2} \otimes_{r=1}^k Y_r^L = Y_t Y_b \quad \text{(l)}$$

According to a third aspect, there is provided a software product for execution on a quantum computing system including a quantum computing arrangement coupled to a classical computing arrangement, wherein the software product is configured when executed to implement a method of the second aspect.

According to a fourth aspect, there is provided a quantum circuit for execution on a quantum computing arrangement of a quantum computing system, wherein the quantum circuit is configured to include additional e-ancilla qubits to implement the method of the second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DIAGRAMS

Embodiments of the disclosure will be described by way of example, with reference to the following drawings, wherein.

In the accompanying diagrams, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION OF EMBODIMENTS

Figure 1:
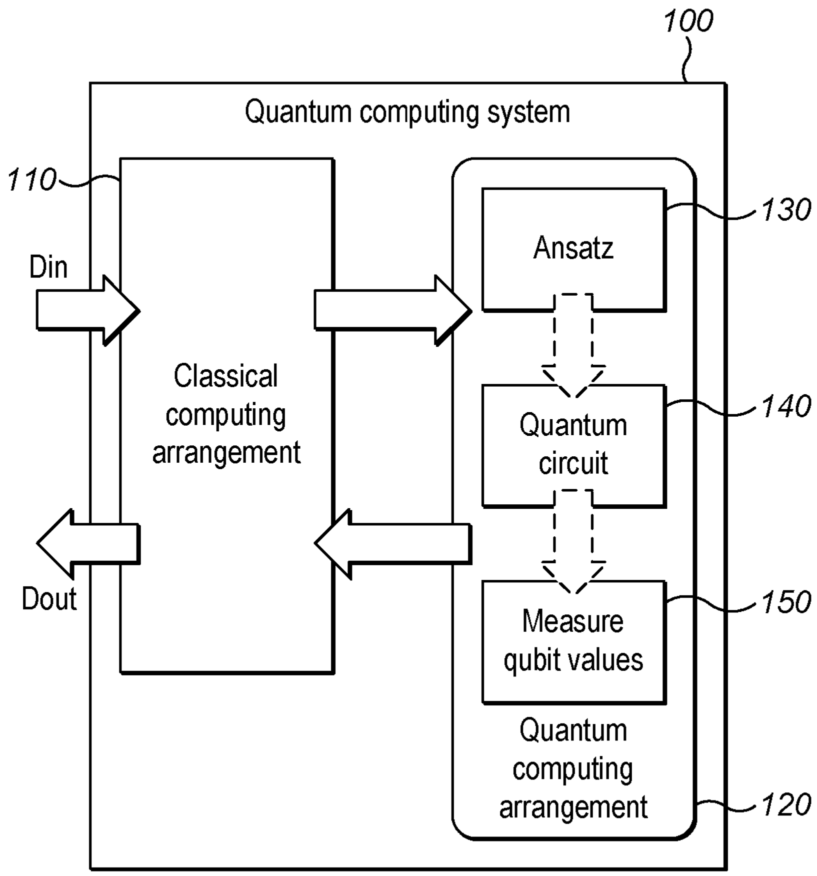
FIG. 1 is an illustration of a quantum computing system including a classical computing arrangement coupled to a quantum computing arrangement, wherein the classical computing arrangement and the quantum computing arrangement operate in tandem to execute computational tasks involving the generation and execution of quantum circuits.

Referring to FIG. 1, there is shown a quantum computing system 100 that includes a classical computing arrangement 110 coupled to a quantum computing arrangement 120, wherein, in use, data exchange occurs between the classical computing arrangement 110 and the quantum computing arrangement 120. The classical computing arrangement 110 is beneficially implemented using computing apparatus based on Silicon integrated circuit binary logic devices. The quantum computing arrangement 120 is beneficially implemented as a photonics quantum computer, a trapped-ion quantum computer, a cryogenically-cooled Josephson junction quantum computer or similar, wherein entanglement and superposition of qubits occur when the quantum computing arrangement 120 is in use.

In operation, input data Din is received at the classical computing arrangement 110, wherein the input data Din includes one or more computational tasks to be executed by the quantum computing system 100. The classical computing arrangement 110 processes the one or more computational tasks and determines corresponding parameters to configure the quantum computing arrangement 120. The parameters include establishing an Ansatz 130 that determines a parameterised unitary to be implemented on the quantum computing arrangement 130, and a quantum circuit 140 that is applied to process the qubits of the Ansatz 130. The quantum computing arrangement 120 further includes a measuring arrangement 150 for measuring values of the qubits after the quantum circuit 140 has been executed on the qubits. The quantum computing arrangement 120, in use, communicates the measured values of the qubits to the classical computing arrangement 110 which then outputs the measured values of the qubits in output data Dout, and/or stores the measured values of the qubits for use in future computations to be executed in the quantum computing system 100.

When the quantum computing system 100 is in operation, quantum noise, stochastic thermal noise, decoherence and crosstalk arise when generating the Ansatz 130, when executing the quantum circuit 140 and when measuring values of the qubits when the quantum circuit 140 has been executed. The noise can vary from one "shot" to another executed through the quantum computing arrangement 120. Embodiments of the present disclosure pertain to an implementation of the quantum computing system 100 wherein, if an error in the measured qubit values 150 for an execution of the quantum circuit 140 in a given "shot" is detected, the "shot" is repeated until no error in the measured qubit values 150 is detected. The measured qubit values 150 of a given "shot" that are detected to be in error can beneficially be discarded by the quantum computing system 100.

Figure 2:
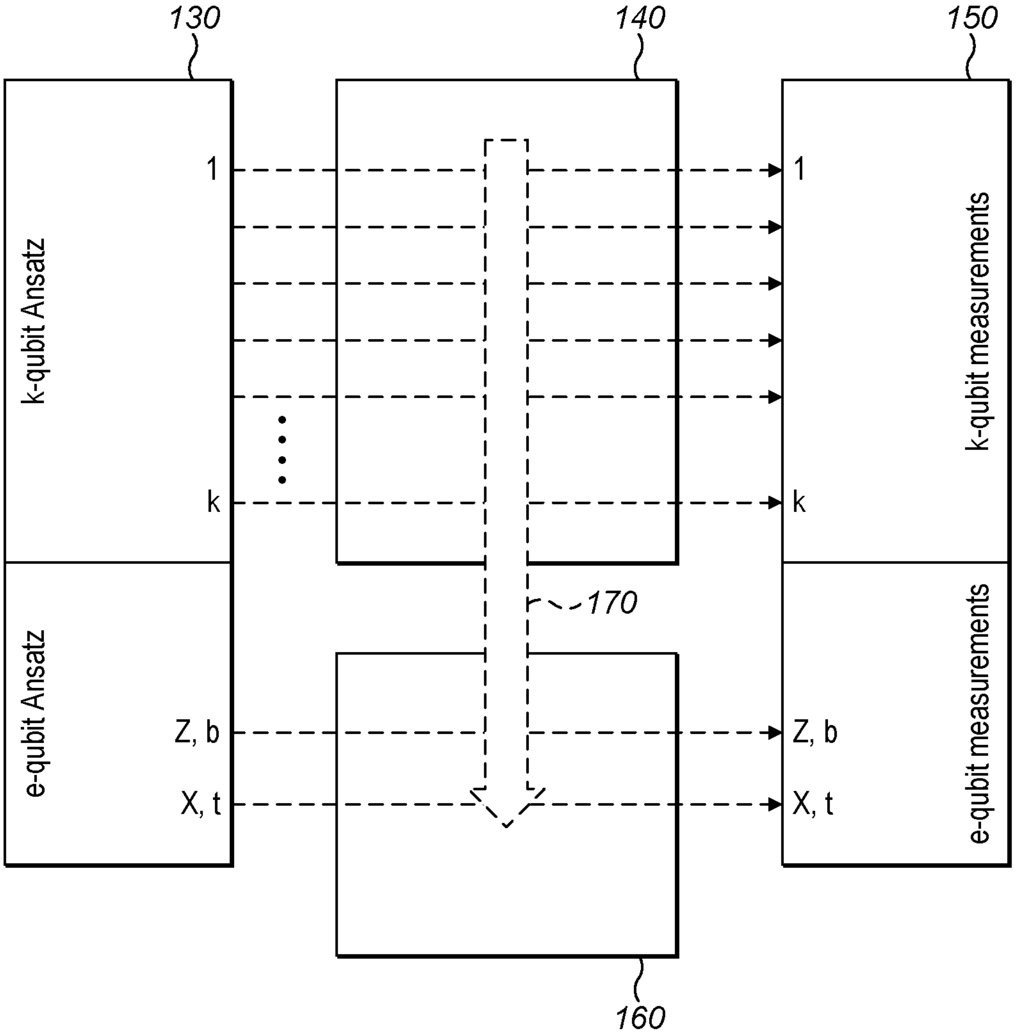
FIG. 2 is an illustration of qubits, Ansatz, quantum circuit and qubit measurement arrangement as used in the quantum computing system of FIG. 1.

Referring next to FIG. 2, in embodiments of the present disclosure, the Ansatz 130 is complemented by e ancilla qubits, for example two (2) ancilla qubits X and Z. During execution of the quantum circuit 140, additional quantum gates included in the quantum 140 implement an error detection function that acts upon the ancilla e-qubits Z and Z. When measuring the values of k-qubits and also the e-qubits at 150, the value of the e-qubits is indicative of whether or not an error has occurred when applying the quantum circuit 140 to the k-qubits.

Figure 3A:
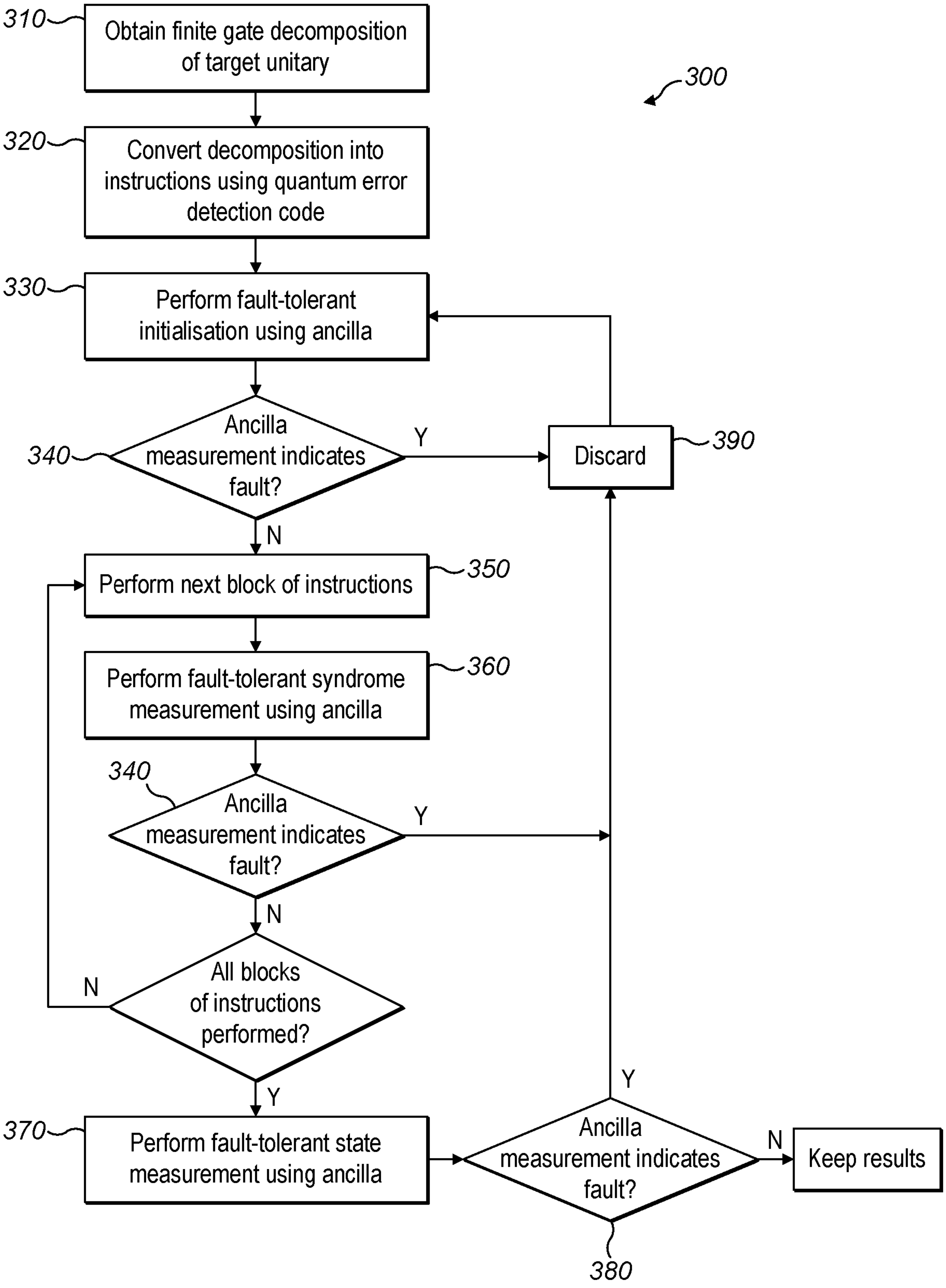
FIG. 3A is a flow diagram of steps of a method in accordance with an embodiment of the present invention.
Figure 3B:
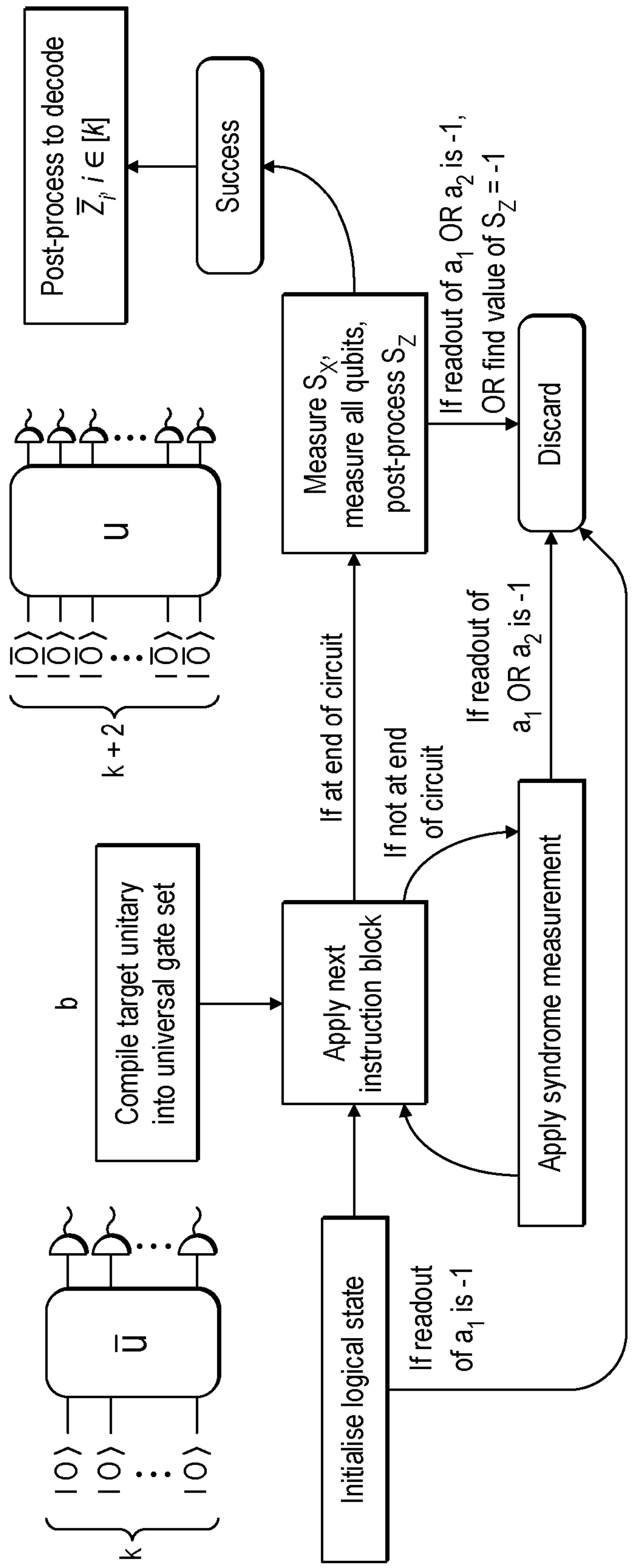
FIG. 3B is a flowchart showing an example approach for carrying out the method of FIG. 3.
Figure 4:
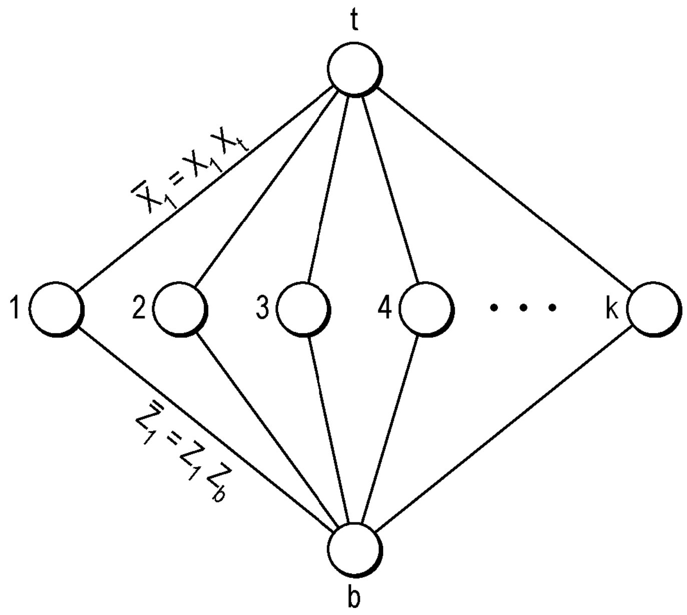
FIG. 4 is an illustration of 1 to k qubits mapped onto qubits t and b by an error detection function.

As shown in FIG. 3, herein a method 300 for performing quantum operations with quantum error detection is introduced.

Generally, a quantum operation may be performed by initialising one or more qubits in a quantum state, for example the computational state, performing a specific unitary operation on the one or more qubits, wherein the unitary operation at least in part characterises the quantum operation and then performing a measurement on at least some of the one or more qubits. The quantum operation may be implemented on a quantum computer by the quantum computer implementing a quantum circuit. A target unitary operation can be implemented on a quantum circuit by enacting a finite number of quantum gates that form an approximation to the target unitary.

Quantum error detection introduces the problem of how and when to sample the quantum operation to detect error. The quantum error detection code allows for a syndrome measurement that can detect errors that may be introduced by certain operations before the syndrome measurement. The syndrome measurement is itself fault-tolerant, that is, no single component used to perform the syndrome measurement will produce an undetectable logical error. The syndrome measurement only required an additional physical qubit overhead of two ancilla qubits thus the physical qubit overhead for implementing the logical circuit is kept to just four extra physical qubits. If a fault is detected, the computation is discarded and the operation is restarted. Thus a lower overhead is provided in exchange for a probabilistic completion time based on the discard rate. The code allows for initialisation of a quantum state and quantum measurement of the state to also be performed fault-tolerantly. The syndrome measurement may therefore be used to detect errors introduced between initialisation and the first syndrome measurement, between the last syndrome measurement and the final quantum measurement of the state, and in between the syndrome measurements. A later fault tolerant step may also detect a different type of error, a flipped stabiliser error, output from an earlier fault-tolerant operation. The operations on the quantum circuit performed by the quantum computing system in between the syndrome measurements may be comprised of quantum logic gates from a universal gate set to allow arbitrary quantum unitary gates to be performed on the circuit. It is possible for the quality of the quantum operation performed by the quantum computing system, as measured by e.g. quantum volume, to be maintained, even if the gates performed in between the syndrome measurements are not fully fault-tolerant. In particular, it is possible to rely on certain operations that can be performed more easily by certain types of quantum apparatus in order to allow for improved quantum performance.

The method 300 comprises a step 310 of obtaining a finite gate decomposition approximation of the target unitary, $\underline{U}$, for a quantum circuit of k logical qubits, for any real integer k. The finite gate decomposition may be composed of unitary gates from a predefined subset of all unitary gates for example a minimal universal gate set. The finite gate decomposition may be calculated based on the target unitary to obtain the finite gate decomposition or the finite gate decomposition may be received from an external source that performs the calculation.

The method 300 further comprises a step 320 of converting, using a quantum error detection code, the finite gate decomposition for a quantum circuit of k logical qubits into a set of instructions for performing a quantum circuit on n physical qubits.

Herein is introduced a quantum error detection code that encodes k (even) logical qubits, [k]={1, 2, . . . , k}, with a code distance of 2 using n=k+e physical qubits, wherein preferably e=2. These n qubits [n] are labelled 1, . . . , k, t (top), b (bottom)—see FIG. 3. The code has two stabilisers:

X acting on all qubits $$S_X = X_t X_b \otimes_{q=1}^{k} X_q$$

Z acting on all qubits $$S_Z = Z_t Z_b \otimes_{q=1}^{k} Z_q$$

The logical single-qubits operators of the code are defined as illustrated in FIG. 3:

$$- X_q^L = X_t X_q \text{ for } q = 1, \ldots, k$$

$$- Z_q^L = Z_b Z_q \text{ for } q = 1, \ldots, k$$

The Pauli-X logical operators act on t (top) and a numbered qubit while Pauli-Z logical operators act on b (bottom) and a numbered qubit.

For fault-tolerant operation, there is required two additional ancilla qubits, that we generically label $a_Z$ and $a_X$. In total we can implement the code in hardware with k+4 physical qubits.

The code is an error detection code meaning errors can be detected but not corrected. At runtime during execution of the quantum circuit 140, when an error is detected then the current shot of the circuit 140 being executed can be discarded.

The aforesaid codes, conveniently referred as being "iceberg codes", have the useful property that some high weight products of logical operators reduce to low weight encoded operations. To demonstrate this, all products of pairs of code qubits are listed below.

$$X_q^L = X_t X_q \text{ for } q = 1, \ldots, k \tag{a}$$

$$X_q^L X_{q'}^L = X_q X_{q'} \text{ for } q \neq q' \text{ where } q, q' \in \{1, \ldots, k\} \tag{b}$$

$$\bigotimes_{r \neq q} X_r^L = X_q X_b \text{ for } q = 1, \ldots, k \tag{c}$$

$$\bigotimes_{r=1}^{L} X_r^L = X_t X_b \tag{d}$$

$$Z_q^L = Z_b Z_q \text{ for } q = 1, \ldots, k \tag{e}$$

$$Z_q^L Z_{q'}^L = Z_q Z_{q'} \text{ for } q \neq q' \text{ where } q, q' \in \{1, \ldots, k\} \tag{f}$$

$$\bigotimes_{r \neq q} Z_r^L = Z_t Z_q \text{ for } q = 1, \ldots, k \tag{g}$$

$$\bigotimes_{r=1}^{k} Z_r^L = Z_t Z_b \tag{h}$$

-continued $$Y_q^L Y_{q'}^L = Y_q Y_{q'} \text{ for } q \neq q' \text{ where } q, q' \in \{1, \ldots, k\} \quad \text{(i)}$$

$$X_q^L \otimes_{r \neq q} Z_r^L = Y_t Y_q \text{ for } q = 1, \ldots, k \quad \text{(j)}$$

$$Z_q^L \otimes_{r \neq q} X_r^L = Y_q Y_b \text{ for } q = 1, \ldots, k \quad \text{(k)}$$

$$(-1)^{1+k/2} \otimes_{r=1}^{k} Y_r^L = Y_t Y_b \quad \text{(l)}$$

The logical operators may be expressed in other notations:

$$\bar{X}_q \equiv X_q^L$$

$$\bigotimes_{r \in [k] \setminus q} \bar{X}_r \equiv \bigotimes_{r \neq q} X_r^L$$

$$\bigotimes_{r \in [k]} \bar{X}_r \equiv \bigotimes_{r=1}^{k} X_r^L$$

It will be appreciated that products of two logical operators, in either X, Y or Z, do not increase in weight and remain products of two physical operators—(b), (f) and (j). Furthermore, it will be appreciated that global (or almost global) logical operators are reduced to products of only two physical operators—(c), (d), (e), (h), (i), (k) and (l). This makes it possible to implement what would otherwise be extremely challenging multi-qubit logical unitaries on k or k−1 qubits using only two-qubit physical qubit operations. A system therefore only needs to be able to provide all-to-all connectivity between qubits, that is, the system just needs to be able to provide gates between any two physical qubits. Global logical operators acting on k or k−1 logical qubits are also supported by physical operators on two physical qubits. A logical unitary generated by, for example, logical operator $$\left(-\frac{i\theta\sigma_i\sigma_j}{2}\right),$$

is supported by a corresponding physical unitary generated by $Z_t Z_b$.

As single qubit, two qubit, k−1, and k qubit logical Pauli operators are supported by two-qubit physical Pauli operators, single, two, k−1, and k qubit logical rotation operators are supported by two-qubit physical rotations of the form exp $$\bigotimes_{r=1}^{k} X_r^L,$$

where σ∈ {X, Y, Z}. Beneficially, trapped-ion computers can perform such two qubit operations with high fidelity.

The steps of obtaining the finite gate decomposition and converting the finite gate decomposition may be performed by a classical computing system. For example this may be a classical computer with a processor that is able to transmit the set of instructions to a quantum computing system where the quantum computing system comprises at least k physical qubits and a top physical qubit and a bottom physical qubit, which the quantum computing system is configured to implement a quantum circuit on along with at least two ancilla qubits. Generally the quantum computer may be implemented with any type of quantum hardware and be applied for any kind of application or algorithm.

The quantum computing system receives a set of instructions for carrying out the target unitary, $\underline{U}$, according to the decomposition using the quantum gate set, wherein the set of instructions comprises a plurality of blocks of instructions. The method 300 further comprises the quantum computing system fault-tolerantly initialising the logical state of the k logical qubits using an n qubit quantum circuit and a first ancilla, $a_z$ in step 340. The choice of initial logical state may be arbitrary and may be chosen according to the operation that is being performed, for example, a uniform superposition over all logical qubit states for a Grover's search algorithm implementation. However, the initialisation should be fault tolerant when enacted using the quantum error detection code. This may be done by using only a single ancilla. A fault tolerant initialisation of a state on the n physical qubits corresponding to an all zeroes logical state using the iceberg code and the ancilla, $a_z$, is set out below in conjunction with the description of FIG. 5.

The method 300 further comprises quantum computing system performing (step 350) each block of instructions of the plurality of blocks of instructions. Each block of instructions may comprise instructions which when carried out by the quantum computing system cause it to enact a quantum circuit on the n physical qubits corresponding to a finite number of logical quantum gates on the k logical qubits. Carrying out all of the instructions of all of the blocks of instructions enacts the quantum circuit on the n physical qubits that corresponds to the finite quantum logical gate decomposition that implements the finite approximation of the target unitary.

It is not necessary for the instruction blocks to be enacted fault tolerantly for the quantum operation to be implemented while maintaining non-classical processing. An appropriate choice of gate set for the finite gate decomposition may still allow for detection of at least some logical errors when performing each instruction block when using the Iceberg code. Each block of instructions may comprise at least one instruction for performing at least one quantum gate on a n qubit quantum circuit by a quantum computing system. As the instructions were prepared using the quantum error detection code, each gate on the n physical qubits will correspond to a gate on the k logical qubits. The finite approximation of the unitary may be compiled using only gates from a universal gate set. Generally, any universal gate set may be chosen. However, it is preferable to use a gate set that takes advantage of the mapping of global logical operations to two qubit physical operations. In particular, global rotations on the logical qubits are mapped to two-qubit rotations on the physical qubit. The universal gate set for the logical gates may comprise at least one of single qubit rotations, $$R_X(\theta) = \exp\left(-i\, X\frac{\theta}{2}\right),$$

$$R_Z(\theta) = \exp\left(-i\, Z\frac{\theta}{2}\right),$$

or two-qubit logical rotations $$R_{XX}(\theta) = \exp\left(-i\, XX\frac{\theta}{2}\right),$$

$$R_{YY}(\theta) = \exp\left(-i\, YY\frac{\theta}{2}\right),$$

$$R_{ZZ}(\theta) = \exp\left(-i\, ZZ\frac{\theta}{2}\right).$$

This is particularly advantageous for quantum computing systems implemented using trapped ions.

The logical circuit for enacting the target unitary U may be compiled by a classical computing system, and then transmitted to the quantum computing system to be carried out in its encoded physical form. A generic approach to compiling a target unitary U into a logical circuit is to first compile U into a gate set that only contains single-qubit rotations—RX(θ)=exp(−iθX/2) and RZ(θ)=exp(−iθZ/2)—and two-qubit logical rotations—RXX(θ)=exp(−iθXX/2), RY Y (θ)=exp(−iθY Y/2), RZZ (θ)=exp(−iθZZ/2). This can be done using the TKET compiler as described in "System and Method for Generating a Quantum Circuit", U.S. Pat. No. 11,144,689 B1. Once expressed using single and two-qubit logical gates, each gate in the circuit can be directly compiled into its encoded physical form using Mølmer-Sørensen, MSij (θ), gates, where $$MS_{ij}(\theta) = \exp\left(-\frac{i\theta Z_i Z_j}{2}\right), \theta \in (0, 2\pi),$$

along with up to four single-qubit Clifford gates, H, S, $S^\dagger$, CNOT. This is not fault-tolerant because two-qubit Pauli errors of the form $X_iX_j$, $Y_iY$, or $Z_iZ_j$ after a $MS_{ij}(\theta)$ gate produce undetectable logical errors for any pair i, j∈[n]. However, single qubit Pauli errors and two qubit Pauli errors where the two Pauli operators are different from each other are detectable so the number of non-detectable errors is reduced compared to not using the Iceberg code.

Furthermore, physical gates of the form $MS_{ij}$ may be used for any logical rotation of the set of logical rotations of the form exp $$\left(-i\,\overline{P}_{\sigma_{ij}}\frac{\theta}{2}\right),$$

for θ∈(0, 2π), where $\overline{P}_{\sigma IJ}$ is any one of the operators (a)-(l), including, for example, $$\overline{P}_{\sigma_{tb}} = \bigotimes_{r=1}^{k} Z_r^L.$$

The universal gate set may be defined as the set of logical rotations of the form exp $$\left(-i\,\overline{P}_{\sigma_{ij}}\frac{\theta}{2}\right),$$

fir θ∈(0,2π). Therefore global rotations on k and k−1 logical qubits are included in the universal gate set without requiring any higher cost physical operator. Thus the performance of the system implementing the compiled circuit may be improved without any further cost in physical resources.

After each instruction block is performed, and before the next one is, the method 300 comprises a step 360 wherein the quantum computing system performs a fault-tolerant syndrome measurement of the $S_z$ and $S_x$ stabilisers using the first ancilla, $a_z$, and a second ancilla, $a_x$, respectively. The syndrome measurement may be performed using only two ancillas. The syndrome measurements may be performed at predetermined steps during the execution of the circuit or at predetermined times. The size of each block of instructions may vary from each other block. The blocks may be equally sized e.g. they describe the same number of gates, however this may be adjusted to preserve any logical operations e.g. to make sure a syndrome measurement is not inserted between the Hadamards and $MS_{ij}(\theta)$ gate of $\exp(-i\theta XX_iX_j/2)=(H_iH_j)MS_{ij}(\theta)(H_iH_j)$.

The syndrome measurement may enable readout of the stabiliser eigenvalue without disturbing the logical information. The quantum circuit for syndrome measurement may be based on the quantum error detection code. For example, before the quantum computer system is configured to implement the quantum circuit for the syndrome measurement, the syndrome measurement circuit on the n physical qubits may be checked using the quantum error detection code to determine the quantum circuit it maps to on the k logical qubits, and it is checked that the circuit does not disturb the logical information. This may be similarly done for the initialisation and/or the state measurement. The fault-tolerant non-destructive syndrome measurement may be performed by enacting a quantum circuit that performs CNOT gates between the physical qubits and the ancillas and making a single-qubit measurement of the ancilla. The ancilla may be reset and reused between measurements. The circuit instructions may be arranged so that the ancillas act as flag qubits to each other, allowing the detection of ancillary errors that would otherwise propagate to the rest of the qubits. While various circuits for syndrome measurements may be used, an example is described later in conjunction with the description of FIG. 6.

After all instruction blocks of the plurality of instruction blocks have been applied to the quantum circuit, the method comprises a step 370 wherein the quantum computing system measures performs a measurement of the k logical qubits by performing a fault-tolerant measurement of all of the n physical qubits. The final measurement of all qubits may be combined with the last syndrome measurement performed after the last block of instructions. A final fault-tolerant measurement of the stabilisers and a measurement of a logical qubit operator for each qubit, e.g. $Z_q$, ∀q∈{1 . . . k}, occurs after any previous non-fault tolerant operations. An example of a fault tolerant measurement of the quantum circuit is described later in conjunction with the description of FIG. 7.

The quantum computing system is configured to discard the computer results (step 390) and to restart the computation of the quantum operation based on any measurement of the ancilla indicating a fault. The code space may be defined as the joint subspace of +1 for both stabilisers so that a readout of −1 for either stabiliser from the first or second ancilla indicates the presence of an error. The probability of an attempt at performing the computation surviving until measurement will depend, at least in part, on the probability of a detectable fault occurring during the non-fault tolerant operations between syndrome measurements. The probability of detecting a fault may be increased by increasing the number of syndrome measurements during the operations. The more faults that are detected, the greater the quality of the performance by the quantum computing system in carrying out the quantum operation. Therefore there is a positive effect in increasing the frequency of syndrome measurements within the circuit. However, the discard rate will correspondingly be increased. Therefore the invention provides for a trade-off between quantum computation performance and the number of repetitions required based on the discard rate.

Next, fault tolerant operation will be described. In devising embodiments of the present disclosure, the inventors have identified fault-tolerant quantum circuits, described below in (A), for the following tasks:

Initialisation of the logical codes state $|0_L\rangle$, where $$Z_q^L|0_L\rangle^{\otimes[k]} = +1|0_L\rangle^{\otimes[k]} \ \text{for } q = 1, \ldots, k.$$

Syndrome extraction to simultaneously and non-destructively measure both stabilisers $S_X$ and $S_Z$.

Final measurement involving non-destructive measurement of the stabiliser $S_X$ and destructive measurement of all n qubits in their Z basis, from which the stabiliser $S_Z$ can be reconstructed.

The quantum circuits that have been identified for these tasks are fault-tolerant in the sense that there are no single faults that give rise to an undetectable logical error. Single faults are defined to be local Pauli errors arising from the failure of a quantum circuit element, for example in the quantum circuit 140. Tests have been carried out to verify fault-tolerance that are described in detail in (B).

It will be appreciated that generic logical operations of the code, such as a logical rotation exp $$\left(-i\theta Z_q^L\right),$$

are not implemented fault-tolerantly.

Figure 5:
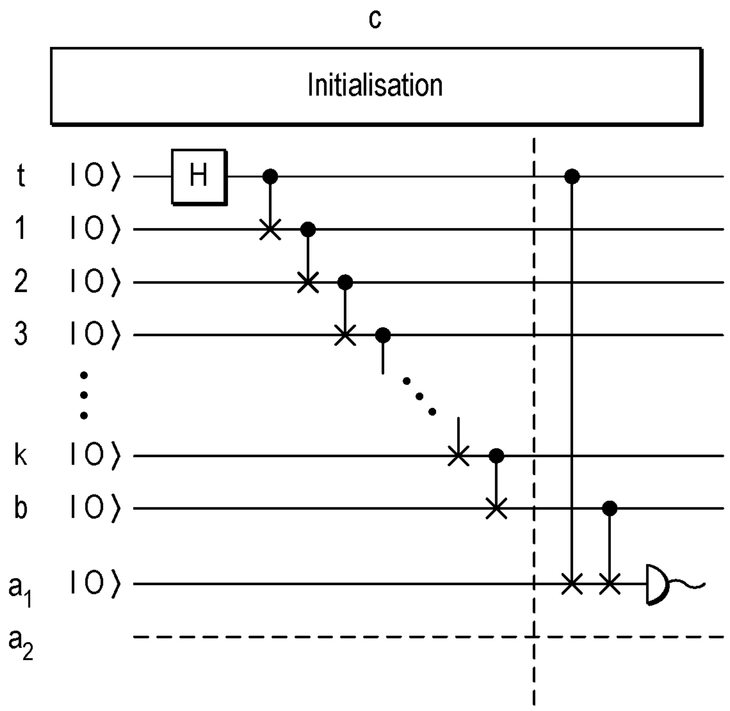
FIG. 5 is an illustration of an initializing quantum circuit used for initialization values of qubits at an outset of executing a quantum circuit.

Furthermore: the choice of finite gate set decomposition can be further selected to be easy to implement on trapped ion quantum computers (A) Circuits Initialisation: An example circuit for fault-tolerant initialisation, for k logical qubits, is illustrated in FIG. 5. The logical qubits are initialised in the all zeros code state $|0_L\rangle^{\otimes[k]}$, which is the state such that $$Z_i^L|0_L\rangle^{\otimes[k]} = +1|0_L\rangle^{\otimes[k]}$$

for all i∈[k], by preparing the physical qubits in the Greenberger-Horne-Zeilinger (GHZ) state, the creation of which is well known. From the definition of the stabilisers and logical operators it can be seen that the all-zeros code state is the GHZ state of the n physical qubits. In embodiments of the present disclosure, there is used a fault-tolerant quantum circuit to achieve this. Generally, a H gate is operated on the top physical qubit and CNOT gates are applied between adjacent pairs of physical qubits {t, 1}, {1,2}, {2,3} . . . {k, b} with a control on the first qubit of the pair. Then a CNOT gate is performed between the top qubit and the first ancilla and then the bottom qubit and the ancilla before a Z basis measurement of the first ancilla with results corresponding to {+1, −1}. If a fault has occurred, the measurement of the ancilla qubit $a_Z$ will return −1 else it will measure +1. When a fault is detected, the results of executing the quantum circuit 140 are discarded.

Figure 6:
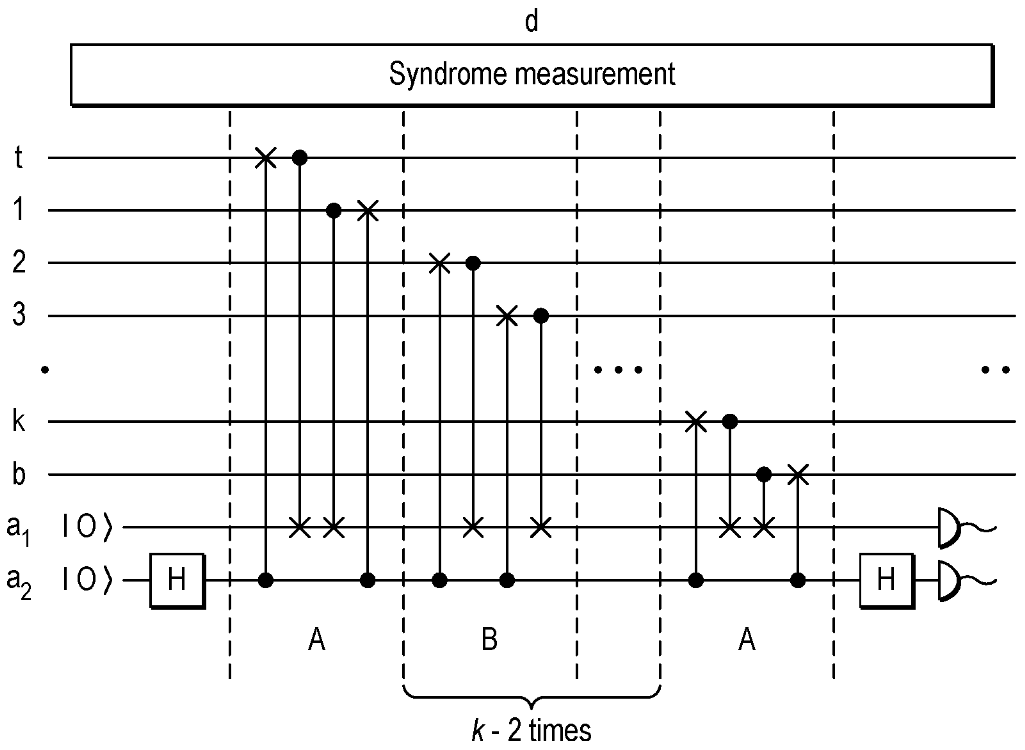
FIG. 6 is an illustration of syndrome extraction from a quantum circuit.

Syndrome extraction: An example circuit for fault-tolerant syndrome measurement, for k+2 physical qubits, is illustrated in FIG. 6. Beneficially, there is simultaneously, non-destructively extract the stabiliser eigenvalues of $S_Z$ and $S_X$. The eigenvalue of $S_Z$ is obtained from a readout of the $a_Z$ ancilla and $S_X$ from the $a_X$ ancilla. Measurement of a−1 on either ancilla means we discard the results. In embodiments of the present disclosure, there is used a flagged scheme (see reference [Chao2020] below), whereby the ancilla $a_X$ acts as a flag qubit for $a_Z$ and vice-versa.

In embodiments of the present disclosure, there are beneficially used syndrome extraction circuits that have an AB . . . BA structure, where A and B denote different arrangements of CNOT gates on the physical qubits. The order of the CNOT gates in these circuits must be respected to preserve the fault-tolerance. The A and B blocks are illustrated for the k+2 physical qubits as illustrated in FIG. 6. Generally, the A block is first applied on the top physical qubit, the [1] physical qubit, and the two ancillas, the B block is then applied k−2 times, and then the A block is applied again on the final, kth physical qubit, the bottom qubit and the two ancillas. The B block is applied to the two ancillas and a pair of adjacent qubits for each pair of adjacent qubits, {2,3}, {3,4}, . . . {k−1, k}.

Figure 7:
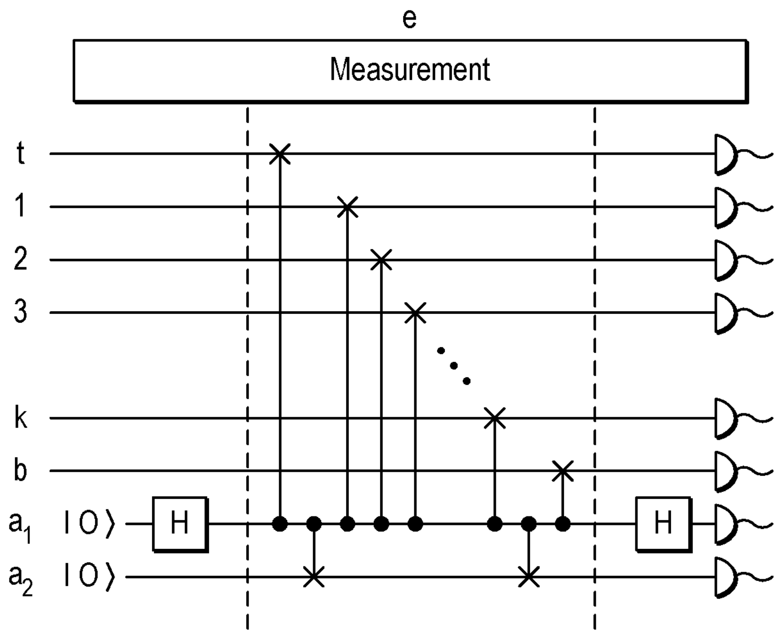
FIG. 7 is an illustration of measurement of qubit values after executing a quantum circuit to perform a quantum computation.

Final measurement: FIG. 7 shows an example of a final fault-tolerant measurement where the final syndrome measurement is combined with measurement of the logical qubits for k logical qubits/k+2 physical qubits. First $S_x$ is measured and then all qubits are destructively measured to evaluate $S_z$ and all logical Z operators in a post-processing step. The destructive measurement of all n=k+2 physical code qubits in their Z basis allows reconstruction of the logical operators $$Z_q^L$$

as well as the stabiliser $S_Z$. This is beneficially prefixed with a non-destructive extraction of the eigenvalue of $S_X$, using a flagged circuit described in [Chao2020]. Here $a_Z$ encodes the readout of $S_X$ and $a_X$ acts as a flag qubit for that readout. Measurement of either $a_Z$ or $a_X$ in the |1> state, or reconstruction of a (−1) eigenvalue of the $S_Z$ stabiliser means the results are discarded as illustrated in FIG. 7.

(B) Verification of Fault-Tolerance

Figure 8:
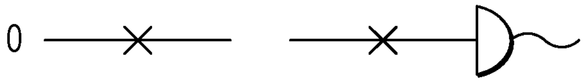
FIGS. 8, 9 and 10 are illustrations of portions of quantum circuit used when implemented embodiments of the present disclosure.
Figure 9:
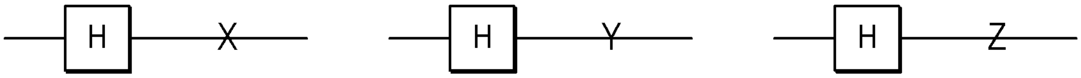
Figure 10:
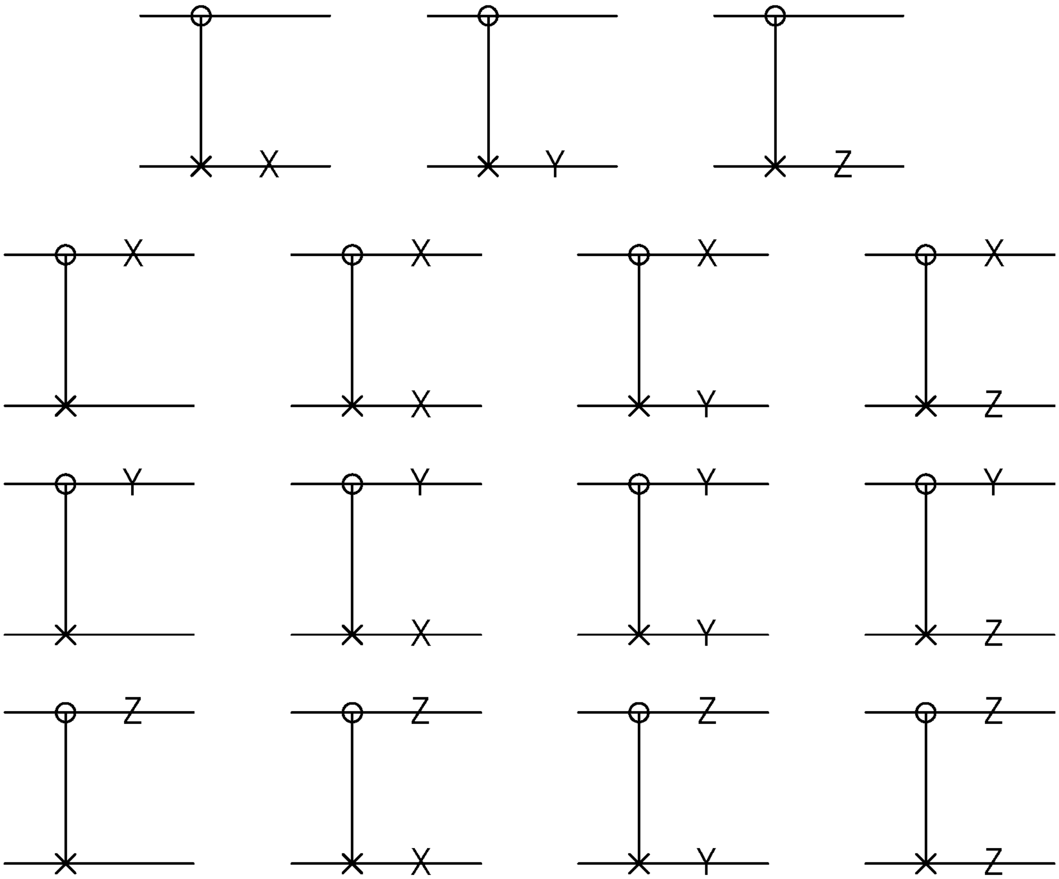

As described previously, the circuits that have been identified in (A) are fault-tolerant in the sense that there are no single faults that give rise to an undetectable logical error. Where single faults are defined to be local Pauli errors arising from the failure of a circuit element, specifically there is considered the following set of single faults as illustrated in FIGS. 8, 9 and 10; these diagrams depict State Preparation and Measurement (SPAM) errors, One qubit gate errors and Two qubit gate errors, respectively.

Figure 11:
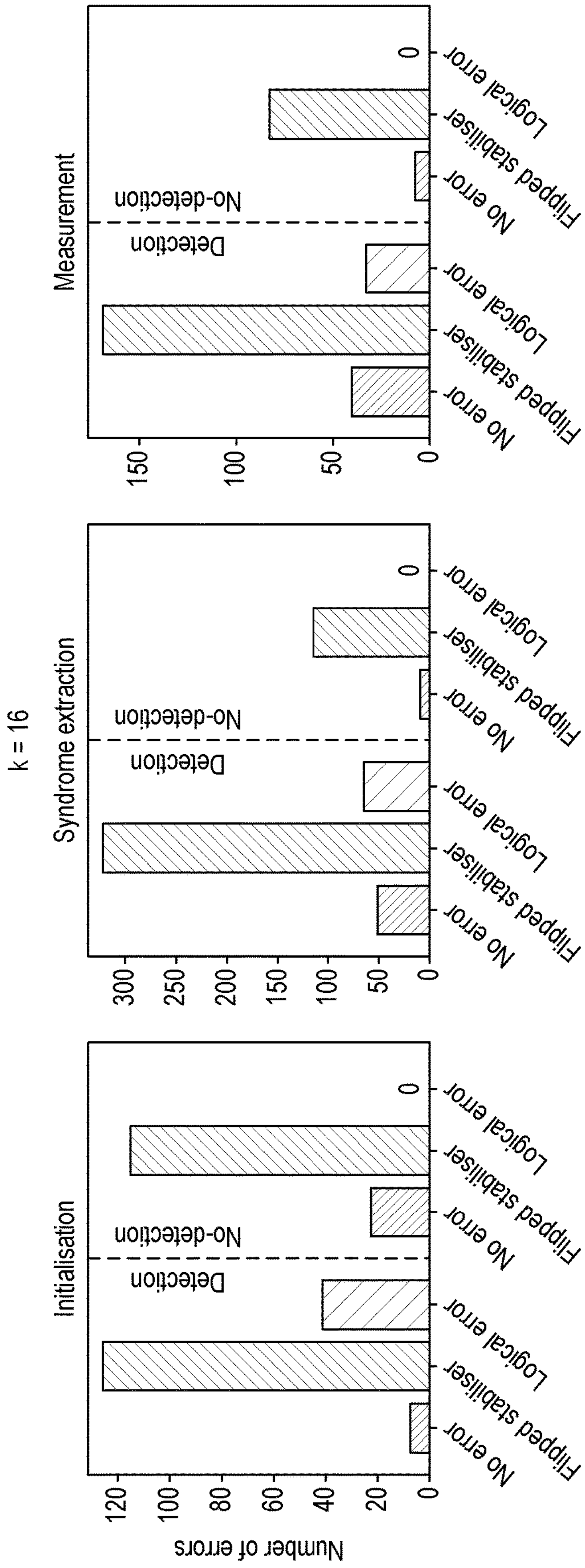
FIG. 11 is an illustration of initialisation, syndrome extraction and measurement, as performed in a quantum computing arrangement of the quantum computing system of FIG. 1.

Referring next to FIG. 11, in devising embodiments of the present disclosure, there have been tests implemented that have exhaustively verified (up to code sizes k=16) that there are no single faults that give rise to an undetectable logical error. As an example, there has been shown by the inventors that the classification of the effect of all single faults acting on the k=16 code into six classes describing their effect.

Referring to FIG. 11, it will be appreciated that local errors are classified based on whether they trigger the detection qubit (left three bars), or do not (right three bars). Within these groups the error can correspond to no error (for example a stabiliser operation), a flipped stabiliser or a logical error. There is shading used to juxtapose the cases based on whether they are ideal behaviour (striped) or non-ideal behaviour that is not a fail or a failure (solid grey). The three circuits are shown to be fault-tolerant because the number of undetected logical errors is zero.

Herein is provided a method for testing the performance of method of performing quantum operations with quantum error detection. In particular, the provided method is suitable for testing methods and systems for performing operations with quantum error detection of the invention. To test the methods and systems of the invention, a test unitary may be assigned to be the target unitary. The invention may be performed with the test unitary for k logical qubits and then a corresponding experiment is performed wherein k qubits are initialised in the same state as the k logical qubits and then the same test unitary is applied without using the encoding of the invention. In each experiment, the final state is measured. The experiments are repeated until a survival probability can be calculated. The survival probability is the probability of measuring the expected final state from the target unitary being applied to the initial state. The survival probabilities of the method with encoding, the invention, and the method without encoding, the control, may be compared. The invention and the control may be compared different values of k and they may be compared for different number of syndrome measurements. The test unitary may be implemented by compiling the target gate into a quantum circuit of finite gates in which case the same gate decomposition should be used for the invention and the control. Preferably, the test unitary is equivalent to identity and is decomposed into a mirror circuit in which randomly selected unitaries are performed as part of the quantum circuit and then the inverse of the randomly selected unitary is performed and the expected final state is the same as the initial state.

Figure 12:
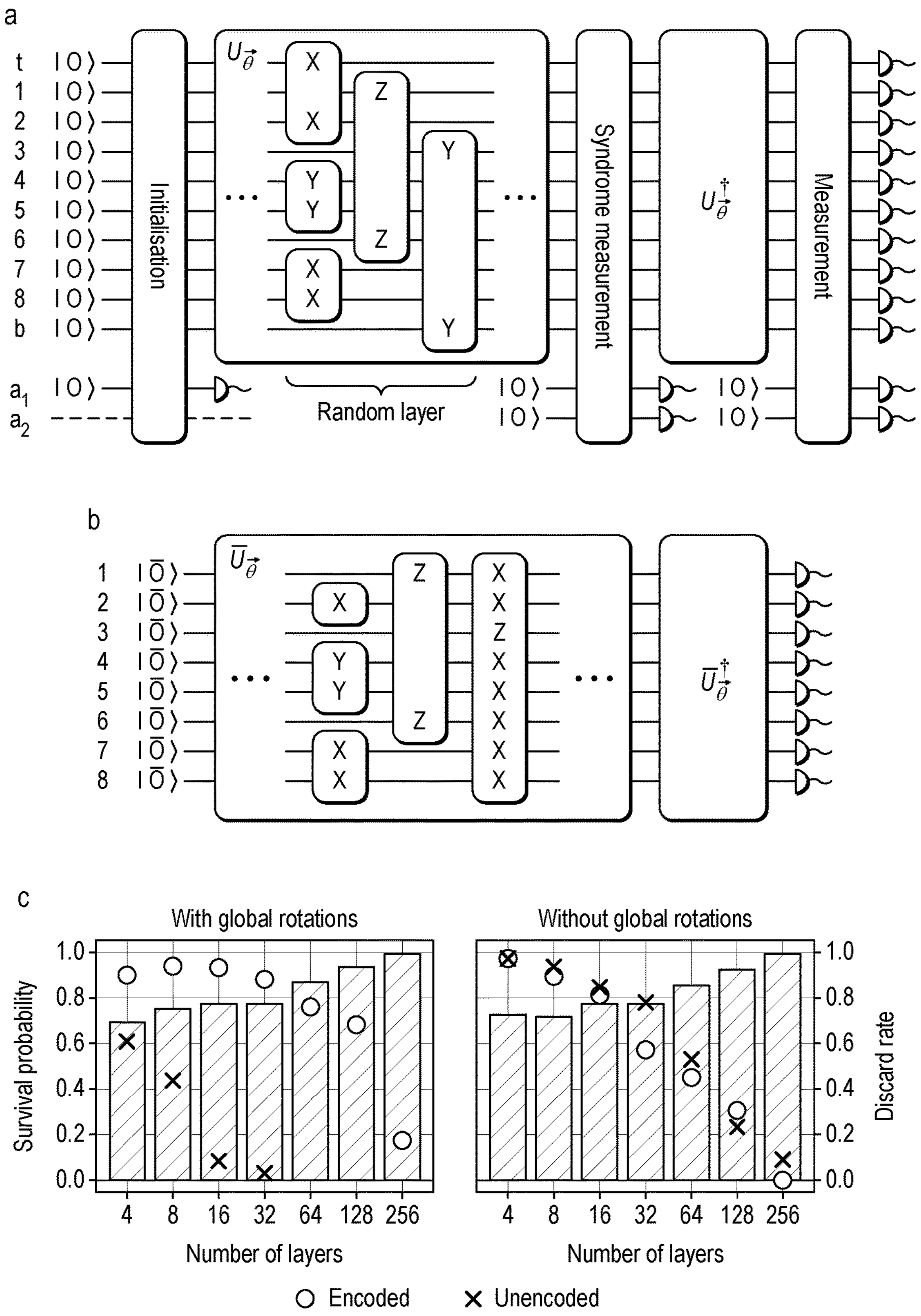
FIG. 12 illustrates a method for testing the performance of a system for performing quantum operations and data from an example of the method of FIG. 3A.

An example of the testing method is provided and data resulting from an implementation of the example testing method is also included. A parameterised mirror circuit drawn from a highly expressive family of random circuits may be used as test unitaries. In FIG. 12(*a-b*), an example of the construction of the random circuits and the correspondence between physical and logical operators is provided. In FIG. 12(*a*) physical compilation of a mirror circuit on 8 logical qubits with the Iceberg code is shown. The circuit implements a parameterised physical unitary and its inverse. The unitary has a layered structure where in each layer physical qubits $[n]=\{1, \ldots, k\}\cup\{t, b\}$ are randomly paired and a random physical rotation $\exp(-i\theta\sigma_i\sigma_j/2)$ is applied on each pair i, j∈[n] for 0€(0, 2π) and σ∈{X, Y, Z}. We illustrate this by showing one layer, where each physical rotation is labelled with its rotation basis. In FIG. 12(*b*), a corresponding logical mirror circuit to that of FIG. 12(*a*) is shown. Shading is used to indicate the correspondence between each two-qubit physical rotation in (a) and logical rotation $\exp(-i\theta\bar{P}_{\sigma ij}/2)$ with logical operator $\bar{P}\sigma_{ij}=\sigma_i\sigma_j$. Note that the last logical operator $\bar{P}_{Y3b}$ has physical support on only two physical qubits but acts globally on all logical qubits. FIG. 12(*c*) shows data from an experiment with the survival probability (symbols) and discard rate (bars) plotted vs number of layers. Number of layers includes the layers in the unitary and its inverse. The survival probability is the probability of measuring the initial logical quantum state $|0\rangle$ on all logical qubits—as expected in the absence of noise.

The encoded circuit, where the logical unitary $\bar{U}\vec{\theta}$ is compiled with the Iceberg code as depicted in FIG. 12(*a*), is compared with the unencoded circuit, where it is compiled into phase gadgets as described in the supplementary information below. Logical circuits with and without global logical gates are differentiated.

Figure 13:
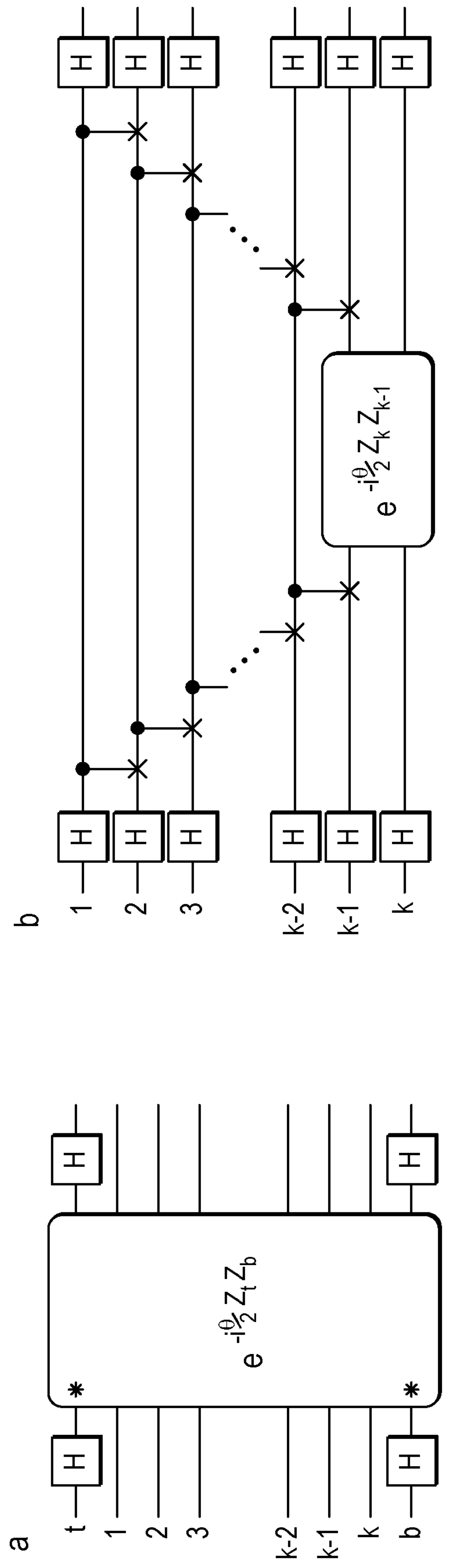
FIG. 13 illustrates two examples of quantum circuits for compiling quantum rotation operations.

FIG. 13 demonstrates compilations of the rotation $R_{Xtb}(\theta)=\exp(-i\theta\bar{P}_{Xtb}/2)$ generated by $\bar{P}_{Xtb}=\otimes_{i\in[k]}\bar{X}_i=X_t+X_b$. FIG. 13(*a*) shows the compilation with the Iceberg code, where the rotation is realised by a single two-qubit. $MS_{tb}(\theta)$ gate, as well as four single-qubit Hadamard gates. FIG. 13(*b*) shows an example of the compiled $R_{\otimes i\in[k]\bar{X}_i}(\theta)$ in the unencoded circuit, where the physical circuit for the same rotation utilises a phase gadget. Since the logical generator of the rotation is a global operator, $\otimes_{i\in[k]}\bar{X}_i$, a ladder of CNOT gates is used to compute the parity before applying a single $MS_{k(k-1)}(\theta)$ gate. Then another CNOT ladder is used to uncompute the parity. Additionally, Hadamard gates on all qubits at the start and end apply a basis change.

The number of layers may be varied, for example from 4 to 256, and the survival probability of the unencoded circuits and the circuits encoded with the Iceberg code are compared. That is, the probability of measuring the initial logical state after implementing a logical unitary and its inverse. In the absence of noise the survival probability is 1 and it decreases with the number of errors in the circuit. Two kinds of logical circuits are analysed: those that contain global logical gates and those that do not. This analysis separates the effect of the compression of global gates from the effect of encoding and error detection. The experiments may be run with at least two randomly chosen circuits; one with global rotations and one without. In the Supplementary Information, we give numerical evidence that these are typical instances. With global logical gates, a more favourable scenario is effectively implemented for the Iceberg code. Indeed the compilation of global logical gates with the code is performed by a single two-qubit MS gate, while two staircases of CNOT gates involving all qubits are necessary in the unencoded compilation. These compilations are described in more detail in the Supplementary Information. In FIG. 12(*c*), left panel, we see that the Iceberg code significantly improves the survival probability of circuits with global rotations.

Without global rotations the unencoded circuit is much simpler than the encoded circuit and does not have the overhead of the initialisation, syndrome measurement and measurement circuitry. For example, at 128 layers the unencoded circuit has depth 331 including 372 two qubit gates, while the encoded circuit has depth 549 with 657 two-qubit gates-when compiled into native hardware gates. In FIG. 12(*c*), right panel, we see that the Iceberg code gives a satisfactory survival probability even for circuits without global rotations. It is important to emphasise that this is a worst case scenario for the Iceberg code, yet we observe good results thanks to the encoding and error detection.

Without global rotations the unencoded circuit is much simpler than the encoded circuit and does not have the overhead of the initialisation, syndrome measurement and measurement circuitry. For example, at 128 layers the unencoded circuit has depth 331 including 372 two-qubit gates, while the encoded circuit has depth 549 with 657 two-qubit gates-when compiled into native hardware gates. In FIG. 2(*c*), right panel, we see that the Iceberg code gives a satisfactory survival probability even for circuits without global rotations. It is important to emphasise that this is a worst case scenario for the Iceberg code, yet we observe good results thanks to the encoding and error detection.

Figure 14:
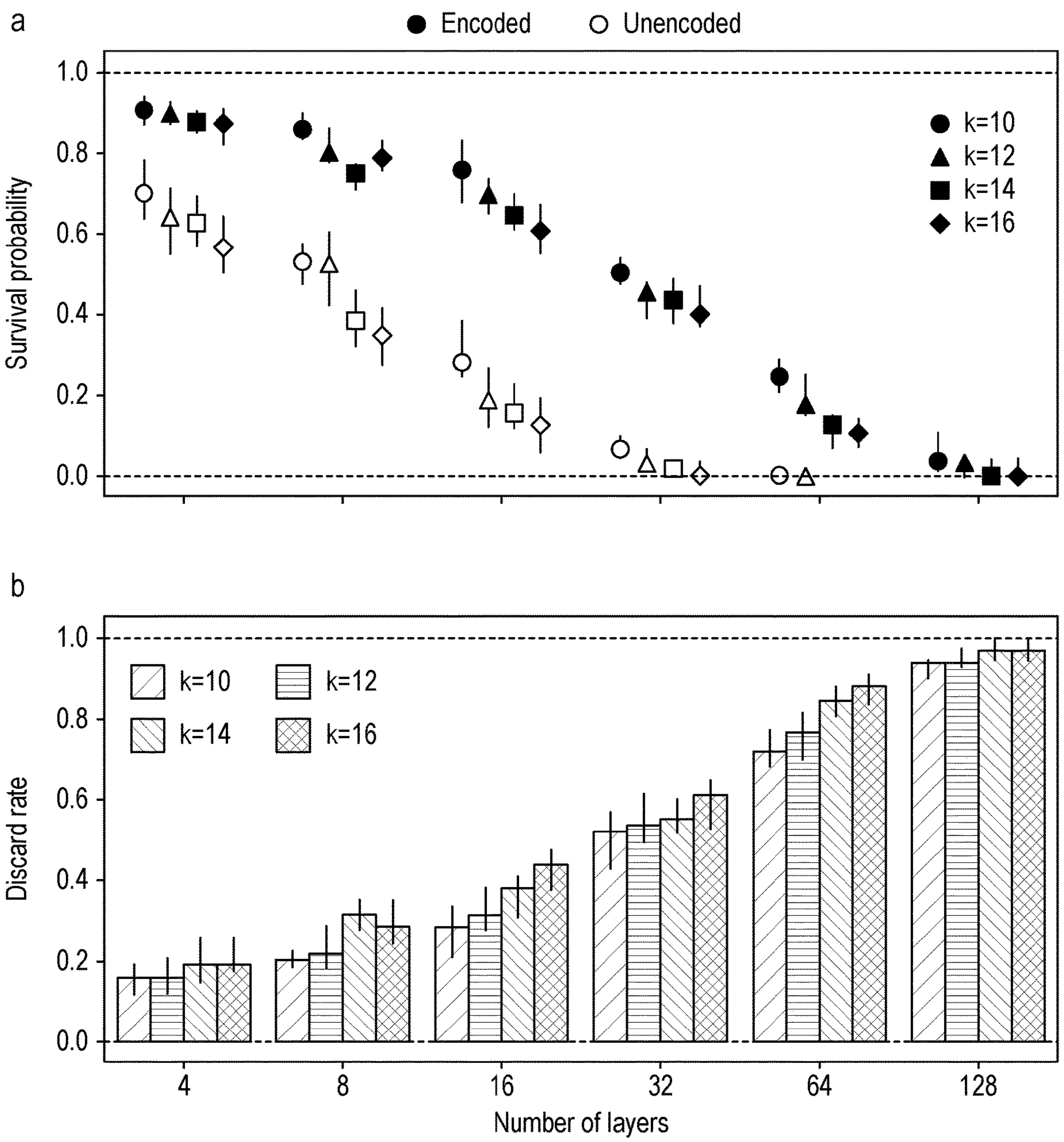
FIG. 14 is a graph of data from numerical simulations of the performance of an example of the method of FIG. 3A.

Numerical simulations may be carried out to investigate the effect of adding layers and logical qubits on performance. Example data from numerical simulations of the performance of random mirror circuits for more logical qubits is shown in FIG. 14 for 8 logical qubits encoded into the 12-qubit Quantinuum H1-2 trapped-ion quantum computer. We simulate 32 instances of the random circuits described in FIG. 2, including global rotations. a Median survival probability is plotted against number of layers for (filled symbols) encoded circuits and (hollow symbols) unencoded circuits for different numbers of logical qubits. b Median discard rates for the encoded circuits in each case. Mid-circuit rounds of syndrome measurement are applied every 16 layers. Error bars in (a) and (b) show the 99% confidence interval on the median, obtained from bootstrap resampling.

For the numerical simulations, it is preferably to include global rotations in the universal gate set. A simplified error model may be used based on the specifics of the model on which it is implemented. For example, example data as shown in FIG. 14 was found using a simplified error model based on the specifics of Quantinuum H1-2 [12]. Full details are given in the Supplementary Information.

FIG. 14(*a*) shows that for a fixed survival probability the encoded circuit (filled symbols) can have approximately four times more layers than the unencoded circuit (hollow symbols). For small number of layers, adding qubits leads to a larger performance gap between encoded and unencoded circuits. The price to pay for using the Iceberg code is given by the discard rate. FIG. 14(*b*) shows an increase in discard rate as we add qubits and layers. This can be compensated by increasing the number of circuit repetitions. In summary this analysis shows the usefulness of the Iceberg code for a large family of highly non-trivial circuits, and for the current generation of trapped-ion quantum computers.

Herein an alternative method is provided for testing the performance of method of performing quantum operations with quantum error detection. In particular, the provided method is suitable for testing methods and systems for performing operations with quantum error detection of the invention. The method comprises a sample efficient, randomised sampling scheme to verify that non-classical processing is happening inside a noisy quantum computer. A test of non-classical processing may be applied for a varied number of syndrome measurements and logical qubits. An example and data demonstrating the application of the test to an example of the invention are provided using the Quantum Volume (QV) test.

The QV test is a commonly used holistic bench-mark of a quantum processor. It utilises random circuits with an equal number of qubits and layers. Each layer randomly pairs the qubits and applies a general SU(4) gate on each pair. Each circuit is measured in its computational basis and a statistic called heavy output frequency (HOF) is computed from the results. The test is passed if the lower uncertainty bound of the average HOF is greater than 2/3, when averaged over many random circuits. The bounds on HOF may be computed using a bootstrapped approach [32].

Figure 15:
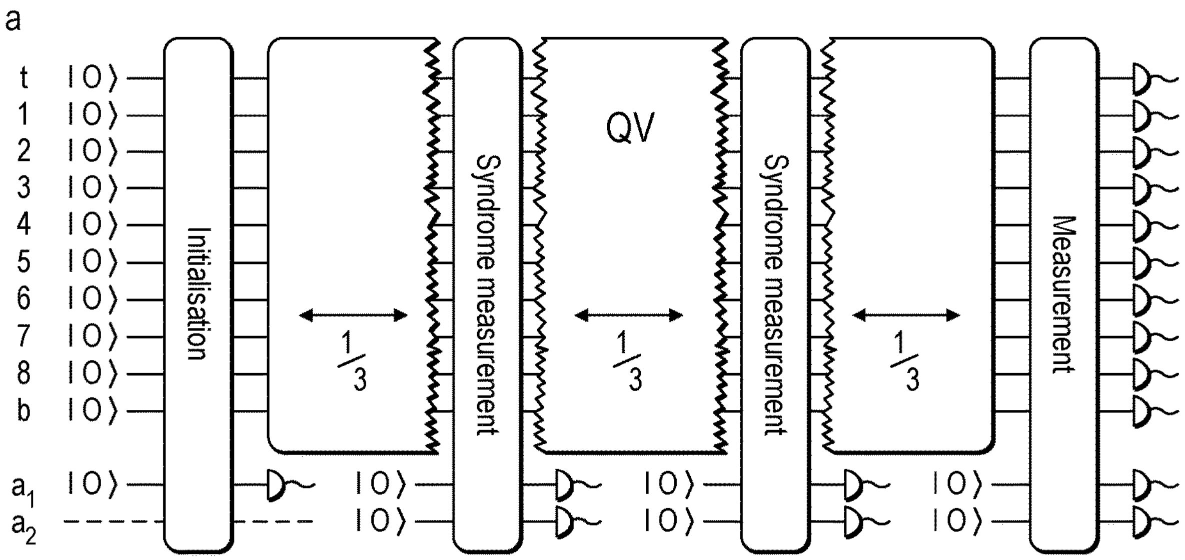
FIG. 15 illustrates an alternative method for testing the performance of an example of the method of FIG. 3A
Figure 15:
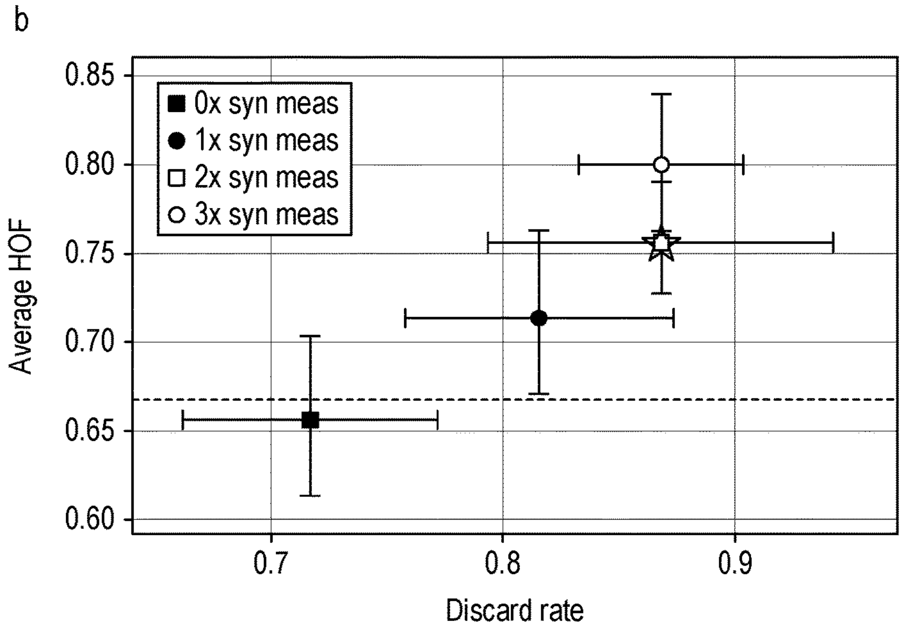
Figure 15:
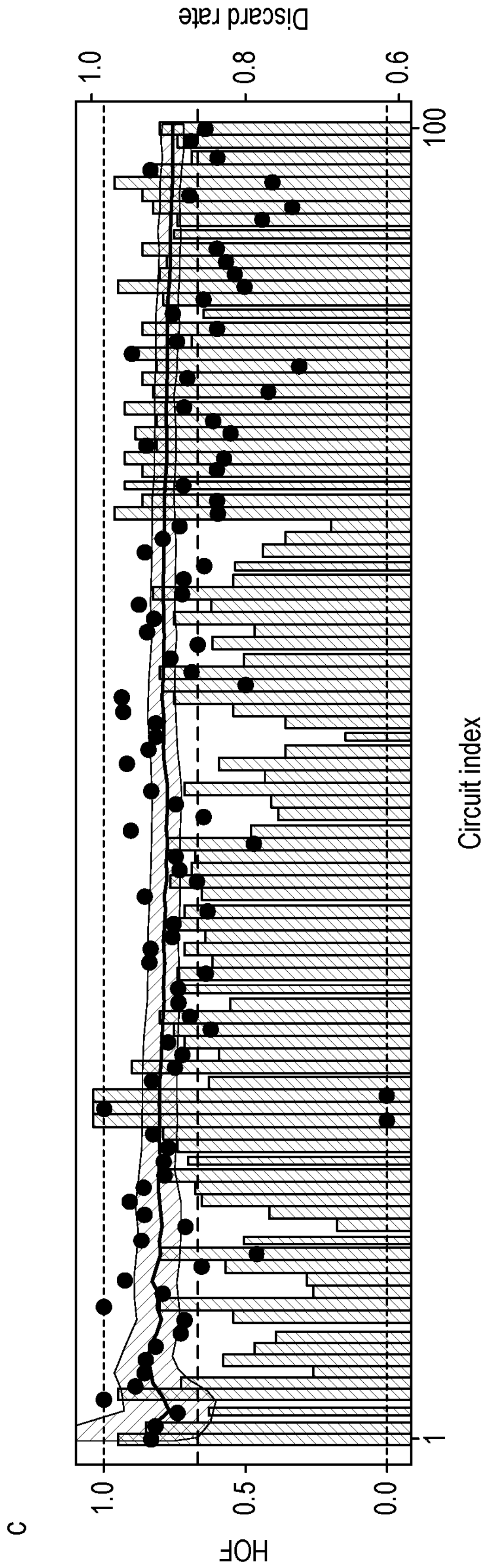

FIG. 15 shows an example of the QV test for demonstrating a logical QV of $2^8$ and showing the positive effective of increasing the number of syndrome measurements when using the Iceberg code. In FIG. 15(*a*), the 8-qubit logical circuit for the quantum volume test is encoded into 10 physical qubits plus two ancillas (a1 and a2). The circuit includes the initialisation of all logical qubits in the |0> state, a varying number of mid-circuit syndrome measurements, a final partial syndrome measurement, and the measurement of all qubits. The case of 2× mid-circuit syndrome measurements is sketched. In FIG. 15(*b*), average heavy output frequency is plotted against discard rate. The passing threshold 2/3 is indicated with a dashed black horizontal line. Vertical errors bars show the bounds on the mean estimate of heavy output frequency. On the horizontal axes we plot the mean discard rate with error bars showing the sample standard deviation. We run 2× syndrome measurements, indicated with a star, for the full 100 circuits required to pass the QV test. For the other QV tests we run 45 circuits instead. In FIG. 15(*c*), experimental results for the individual circuits are shown for 2× syndrome measurements. On the left axes (drawn in red) we plot the heavy output frequency of each circuit after discard, as well as the cumulative mean (increasing upwards) and its bounds. The passing threshold 2/3 is indicated with a dashed line and right axis (plotted as blue bars) shows the discard rate.

The QV circuits may be generated using Qiskit and then compiled into the universal gate set of the Iceberg code. Figure [4] shows an example of circuits that may be run for k=8. Circuits may be broken to insert a varying number of intermediate syndrome measurements. For 0×, 1× and 3× rounds of syndrome measurement we run an abridged QV test that stops at 45 circuits, where the mean HOF seem to have stabilised. The 2× case is continued to the full 100 circuits to demonstrate the passing of the QV test. The HOF for the individual circuits, as well as its cumulative mean and bootstrapped bounds are plotted for the 2× case in FIG. 15(*c*). As shown in FIG. 15(*b*) adding syndrome measurements increases the HOF and consequently increases the confidence in passing the QV test. This improvement comes at the cost of an increased discard rate.

Figure 16:
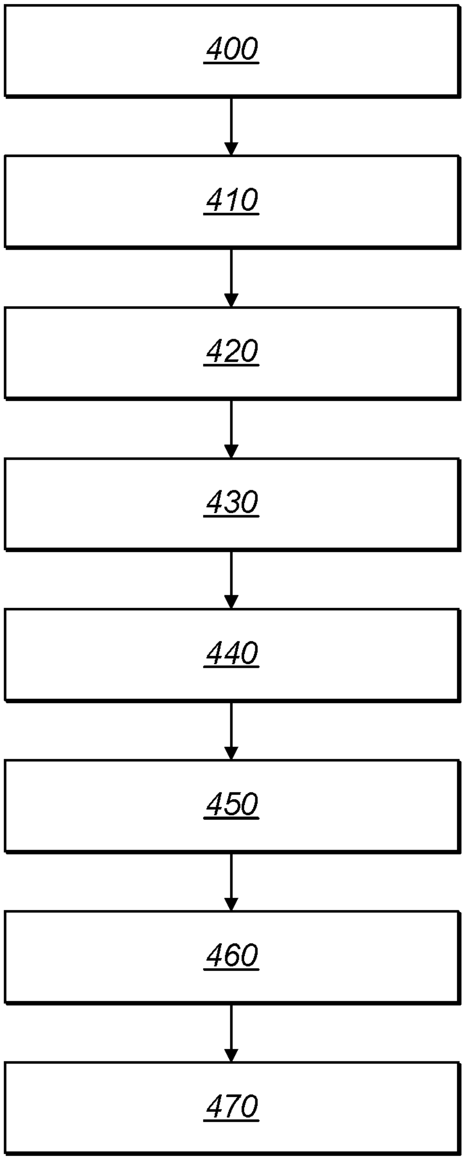
FIG. 16 is a flow chart of steps of a method of the present disclosure.

Referring next to FIG. 16, there are illustrated steps 400 to 470 of a method for implementing error detection in the quantum computing system 100 using the codes as described in the foregoing. The method includes configuring the quantum computing system 100 to provide quantum computing error detection. The quantum computing system 100 includes the quantum computing arrangement 120 coupled to a classical computing arrangement 110, wherein the classical computing arrangement 110 is configured to receive input data thereat and also to send output data therefrom.

In the step 400 of the method, the step 400 includes configuring the classical computing arrangement 110 to process at least one computational task included in the input data by generating a corresponding Ansatz 130 defining initial values of k-qubits, and configuring a quantum circuit 140 in the quantum computing arrangement 120 that, when executed, acts on the k-qubits;

In the step 410 of the method, the step 410 includes configuring the quantum computing arrangement 100 to execute the quantum circuit 140 commencing from the Ansatz 130 to generate computed results for the k-qubits that are measured by the quantum computing arrangement to generate k-measured qubit values.

In the step 420 of the method, the step 420 includes configuring the quantum computing arrangement 120 to communicate the k-measured qubit values to the classical computing arrangement 110 for use in further computations in the quantum computing system and/or for inclusion in the output data.

When implemented error detection, the following additional steps are implemented:

In the step 430 of the method, the step 430 includes configuring the quantum computing arrangement to complement the k-qubits by e-ancilla qubits in the quantum circuit and Ansatz.

In the step 440 of the method, the step 440 includes configuring the quantum computing arrangement to include additional gates in the quantum circuit to couple via a quantum error detection function intermediate states of the k-qubits during execution of the quantum circuit to the e-ancilla qubits.

In the step 450 of the method, the step 450 includes configuring the quantum computing arrangement to measure the e-ancilla qubits at completion of execution of the quantum circuit to generate measured e-ancilla qubit values.

In the step 460 of the method, the step 460 includes configuring the quantum computing system to process the measured e-ancilla qubit values to determine whether an error has occurred during execution of the quantum circuit; and In the step 470 of the method, the step 470 includes configuring the quantum computing system to discard the k-measured qubit values and repeat computation of the Ansatz and quantum circuit in an event that the quantum circuit has been executed with an error that is above the quantum computing error threshold.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "one or more" is to be construed in a likewise manner.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "computer" or "computing-based device" is used herein to refer to any device with processing capability such that it executes instructions. Those skilled in the art will realize that such processing capabilities are incorporated into many different devices and therefore the terms "computer" and "computing-based device" each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible, non-transitory storage medium, e.g., in the form of a computer program comprising computer program code adapted to perform the operations of one or more of the methods described herein when the program is run on a computer and where the computer program may be embodied on a non-transitory computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. No single feature or group of features is necessary or indispensable to every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, blocks, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A; B; C; A and B; A and C; B and C; and A, B, and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The operations of the methods described herein may be carried out in any suitable order, or simultaneously where appropriate. Additionally, individual blocks may be deleted from, combined with other blocks, or rearranged in any of the methods without departing from the scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples, and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

Supplementary Information

Mirror Circuit Experiments

Our mirror circuit experiments use 8 logical qubits encoded into 10 physical qubits. Experiments were executed on the Quantinuum H1-2 trapped-ion quantum computer between the 13 Sep. and 4 Oct. 2022.

In the following we discuss the experiments in more detail. First, we give a full discussion of the construction of the random mirror circuits, followed by additional practical details of the experiment. Next we give an in-depth account of the numerical simulations presented in the main text including the simplified noise model employed and the simulation method. Finally, we present numerical evidence that the random circuits used in our experiments are typical of the random circuit families we construct.

Random Circuit Construction

As described above, random unitaries are constructed starting from the encoded physical circuit. The unitaries are built in layers. Within each layer physical qubits are paired (i,j) for $i \neq j \in [n]$ to give $$\frac{k}{2}+1$$

pairings. For each pairing we uniformly choose $\sigma \in \{X, Y, Z\}$, uniformly sample an angle $\theta \in (0, 2\pi)$, and apply a two-qubit rotation to the pair, of the form:

$$R_{\sigma ij}(\theta) = exp\left(-i\theta\sigma_i\sigma_j/2\right).$$

Logical gates are all physically compiled using a $S_{ij}(\theta) = \exp(-i\theta Z_i Z_j/2)$, gate along with up to four single-qubit Clifford gates. An example of the physical compilation of $R_{Xtb}(\theta)$ is shown in FIG. 13(*a*).

Once the physical random unitary is constructed we map it to the corresponding logical unitary. All physical operators $\overline{P}_{\sigma ij} = \sigma_i\sigma_j$ represent a logical Pauli operator, the full set of relations is given in Eqs. (a)-(l). Logical operators can be single- and two-qubit rotations or rotations with generators that act on k or k−1 qubits. Single-qubit rotations are compiled directly. Two-qubit rotations are compiled using the two-qubit rotation $MS_{ij}(\theta)$ along with up to four single-qubit Clifford gates. Global rotations on k or k−1 qubits are compiled with a phase gadget whose kernel is a $MS_{ij}(\theta)$ gate. FIG. 13(*b*) shows an example of the compiled $R_{\otimes i \in [k] \bar{x}_i}(\theta)$ in the unencoded circuit.

Additional Experimental Details

Circuits are initially constructed in the gateset: $\{H, S, S^\dagger, CNOT, MS(\theta)\}$, using the construction of the initialisation, syndrome measurement and final measurement circuits given in FIG. 1 as well as the construction of the random circuits described previously. These circuits are then compiled into the native gateset of the Quantinuum hardware [25] using the TKET compiler [44].

We consider from 4 random layers up to a maximum of 256. When reporting the number of layers we count the layers in both the unitary and its inverse, in order to count the total number of layers between initialisation and final measurement. In our experiments on circuits encoded with the Iceberg code we insert one round of syndrome measurement between the unitary and its inverse for 32, 64, 128 & 256 layers, while we perform no intermediate syndrome measurements for 4, 8 & 16 layers.

Circuits are run for different numbers of repeats, here we report the total number of repeats (measurement shots) run in each case. For unencoded circuits with global rotations all cases have 300 shots; without global rotations 4, 8 & 16 layers run with 300 shots, 32 layers with 400, 64 layers with 600, 128 layers with 800 and 256 layers with 500. For the encoded circuits both with and without global rotations use the same shot numbers: 4, 8, 16 & 32 layers run with 200 shots, 64 layers with 400, 128 layers with 800 and 256 layers with 500.

Numerical Simulations

The numerical simulations in the main text cover k=10, 12, 14, 16 logical qubits. For each k, we consider increasingly deep circuits, from l=4 layers up to a maximum of 128. At each l, we generate 32 random mirror circuits allowing global logical rotations. Syndrome measurement rounds are inserted after every 16 layers. The noisy output of these circuits is simulated using a Monte-Carlo statevector approach described below. For each circuit we draw 32 statevector samples from the error model. We simulate both the unencoded and encoded version of each random circuit and compute the survival probabilities exactly for each statevector. Averaging the survival probabilities over these 32 statevector samples gives the estimated survival probability of the random circuit.

We simulate a simplified noise model that includes state preparation and measurement (SPAM) errors, as well as depolarising errors acting after gates. SPAM errors are represented with a bit-flip channel applied after qubit initialisation and before measurements, $$\varepsilon_{bitflip}(\rho) = (1 - p_b)\rho + p_b X\rho X.$$

After each single (1q) and two-qubit (2q) gate we apply a depolarising error channel to the qubits acted on by the gate. The operator-sum expressions for these depolarising channels are $$\varepsilon_{1q}(\rho) = (1 - p_{1q})\rho + \frac{p_{1q}}{3}(X\rho X + Y\rho Y + Z\rho Z)$$

$$\varepsilon_{2q}(\rho) = (1 - p_{2q})\rho +$$

$$\frac{p_{2q}}{15}(IX\rho IX + IY\rho IY + IZ\rho IZ + XI\rho XI + XX\rho XX + XY\rho XY + XZ\rho XZ +$$

$$YI\rho YI + YX\rho Yx + YY\rho YY + YZ\rho YZ + ZI\rho ZI + ZX\rho ZX + ZY\rho ZY + ZZ\rho ZZ),$$

where I is the identity and X, Y, Z are the Pauli matrices.

Based on randomised benchmarking of the Quantinuum H1-2 hardware we use the following values for the parameters of the error channels: initialisation errors have a bitflip error rate $p_b=4\times10^{-4}$, measurement errors have a bitflip error rate $p_b=3\times10^{-3}$, single qubit gate errors have a depolarising rate $p_{1q}=4\times10^{-4}$ and two qubit gate errors have a depolarising rate $p^{2q}=3\times10^{-3}$.

Our noisy simulations are Monte-Carlo statevector simulations. For each noise channel we randomly select one of the Kraus operators of the channel with the correct probabilities. The noise channel is replaced with this randomly chosen Kraus operator. Once this is done for all error channels this turns the noisy quantum evolution back into a unitary operator that can be studied with a statevector simulator. By repeatedly sampling different Kraus operators of the noise channels we can approximate the full noisy evolution. This makes larger system sizes accessible by avoiding working with the, exponentially larger, density matrices.

In our quantum error detection circuits we carry out mid-circuit measurements and post-selection. These are implemented in our state-vector simulations with projectors in the computational basis. This allows us to compute both the probability of discard at that mid-circuit measurement and the normalised post-selected state vector (assuming the probability of discard is less than one).

The numerical results presented in the main text were obtained using a Qiskit [33] state vector simulator. The circuits are prepared in the gateset: $\{H, S, S^\dagger, CNOT, MS(\theta)\}$, following the construction of the initialisation, syndrome measurement and final measurement circuits given in FIGS. 5-7 along with the random circuits described previously. We consider the noise model acting on the circuits in this gateset.

In both the unencoded and encoded cases the survival probability is computed exactly from each statevector. In the unencoded case, this is simply the probability amplitude of the all-zeros computational basis state. In the encoded case, we must first extract the full probability distribution of outcomes in the computational basis, we then decode each computational basis state and add up the contributions to the logical all-zeros state.

Figure 17:
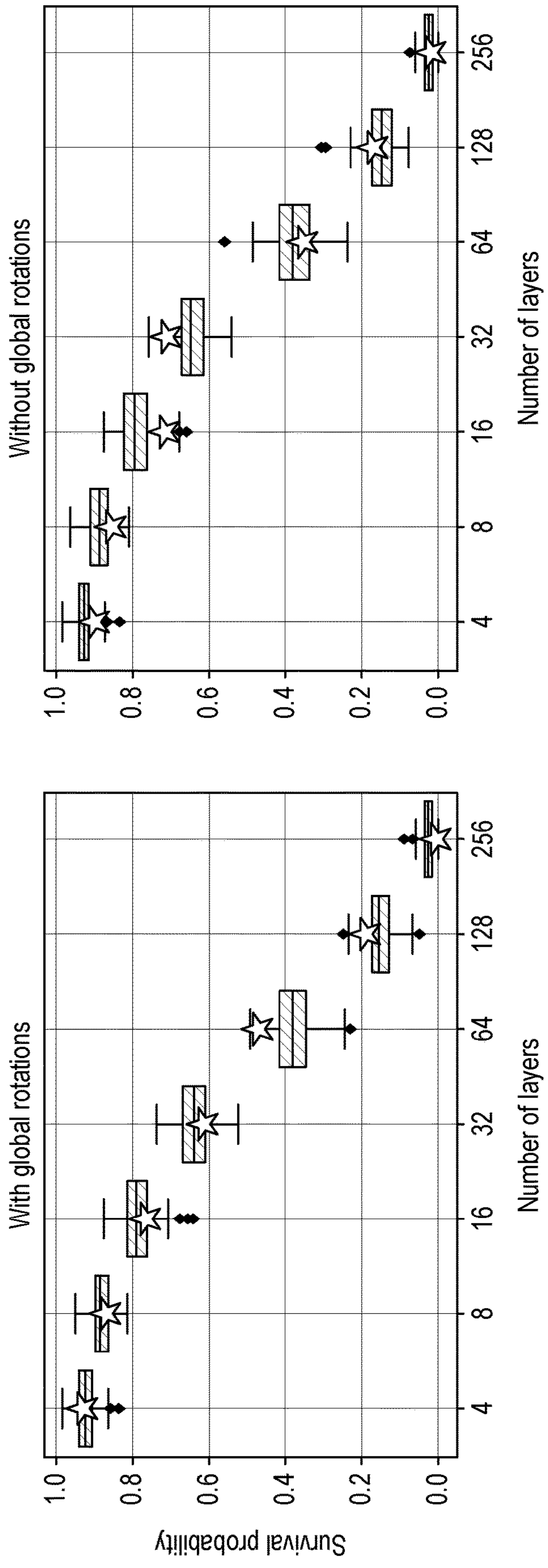
FIG. 17 is a graph of data from numerical simulations of the performance of an example of the method of FIG. 3A.

FIG. 17 shows the distribution of the survival probabilities at each circuit depth for 100 random instances (left) including global rotations and (right) without global rotations, using box plots. Star icons indicate the performance of the random instances that was used in experiments in the main text. Results were obtained from noisy simulations using a simplified noise model.

Typicality of the Instances Used in Experiments

In our experimental results we consider single instances of the random circuit families we describe. For a fixed number of layers, we generate one random circuit for the 'with global rotations' case and another random circuit for the 'without global rotations' version. The circuits generated at different numbers of layers are independent of each other. Here we give numerical evidence that these instances are typical instances of the random circuit families.

At each depth we generate 100 instances of the two random circuit families and FIG. 17 plots the distribution of the survival probabilities we observe as a box plot. Outliers are identified as points that lie more than 1.5 times the interquartile range above (below) the upper (lower) quartile. Each instance is numerically simulated using the simplified error model and statevector simulation method described previously under "Numerical Simulations". For each circuit we average over 100 statevector samples from the error model.

The random instances that were used in experiments are indicated in FIG. 17 with star icons. These cases correspond to fixed seeds for random generators. We see that none of these instances correspond to outliers and they are spread above and below the median.

Logical Quantum Volume Experiments

We have carried out a logical Quantum Volume (QV) test of 8 qubits encoded in 10 physical qubits using the Iceberg code running on Quantinuum's H1-2 trapped-ion quantum computer. The data presented in the main text was obtained between the 27 Jul. and the 8 Oct. 2022.

Here we give more details of these experiments—beginning with a short review of the QV test, followed by a discussion of the preparation of the logical circuits including the optimisations we apply. Next we discuss the encoding of the QV circuits into the Iceberg code. Finally, we give further practical details of the experiment and present additional experimental results.

Figure 18:
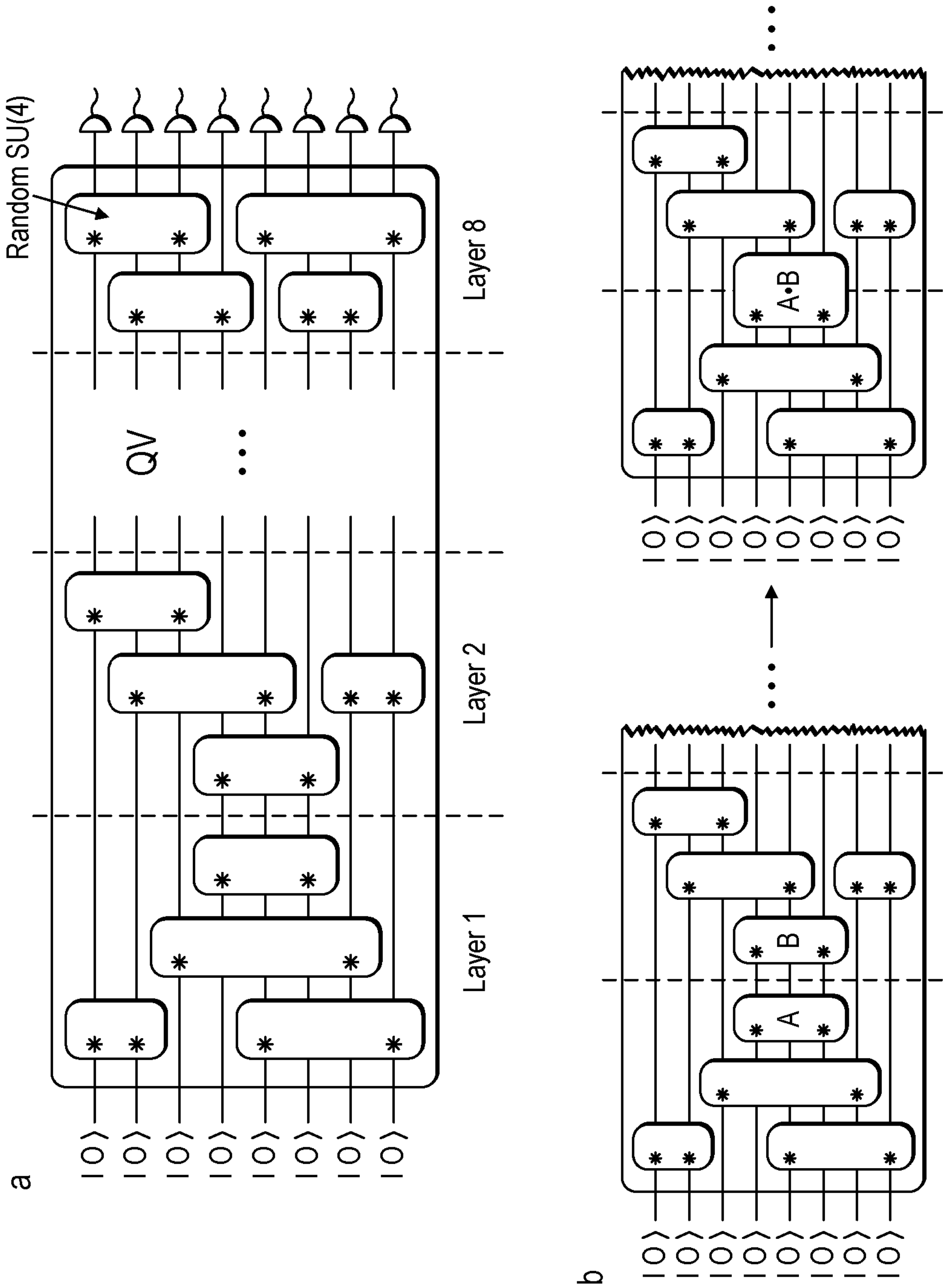
FIG. 18 is a schematic example of a circuit for testing system and methods for performing quantum operations.

FIG. 18(*a*) shows a schematic example of a Quantum Volume (QV) circuit for N=8 qubits. The circuit consists of N layers, within each layer the qubits are randomly paired and the pairs are acted on by a random SU(4). FIG. 18(*b*) shows compression of SU(4) blocks in QV circuits. We show a schematic of the first two layers of a six qubit QV test, where A and B are random SU(4) unitaries. Qubits 4 and 6 were randomly paired in both layers meaning A and B act on the same qubits. They can be combined into a single SU(4) unitary. This will generally result in a shorter circuit depth than applying A and B separately.

QV Test Summary

The QV test is a sample efficient, randomised sampling scheme to verify that non-classical processing is happening inside a noisy quantum computer [31, 32]. The test applies random square circuits of the form shown in FIG. 18(*a*) to k qubits. These circuit have k layers, within each layer the qubits are randomly paired and a random SU(4) unitary is applied to that pair. Finally, all of the qubits are measured in the computational basis.

Each random circuit is simulated noiselessly to obtain the ideal output distribution and from the ideal distribution we determine the set of heavy outputs. These are computational basis states that occur with higher probability than the median. The circuit is executed on a noisy quantum processor with a small number of shots (e.g. 100). The heavy output frequency of the noisy output is computed by counting up the number of shots that measure a computational basis state from the set of heavy outputs.

Heavy output frequency is averaged over the random circuits and the QV test is passed if the average is >2/3. If a device passes a QV test of k qubits, it has quantum volume $2^k$. Average heavy output frequency is not a fidelity measure, for noiseless circuits it is ≈85% and for completely depolarised states it is 50%.

Preparation of the Logical QV Circuits

We use quantum volume circuits generated from Qiskit [33] and implement the 'medium' optimisation method described in Ref. [32]. Using this method SU(4) blocks are combined together when allowed. An example of when this would occur is shown in FIG. 18(*b*).

Following these optimisations, the SU(4) blocks are decomposed into single-qubit rotations—$R_X(\theta)$ and $R_Z(\theta)$—and two-qubit logical rotations-$R_{\overline{XX}}(\theta)$, $R_{\overline{YY}}(\theta)$, $R_{\overline{ZZ}}(\theta)$. This is done using the TKET compiler [43,44]. At this stage we further optimise by squashing together single-qubit logical rotations as much as possible. For example, a sequence of gates $R_{\overline{Z}}(a)R_{\overline{Z}}(b)R_{\overline{Z}}(c)R_{\overline{Z}}(d)R_{\overline{Z}}(e)R_{\overline{Z}}(f)$ can be replaced with a shorter sequence $R_{\overline{Z}}(\alpha)R_{\overline{X}}(\beta)R_{\overline{Z}}(\gamma)$ that applies the same logical rotation. Additionally, we can remove Pauli-Z rotations that act immediately after initialisation and immediately before measurement.

Figure 19:
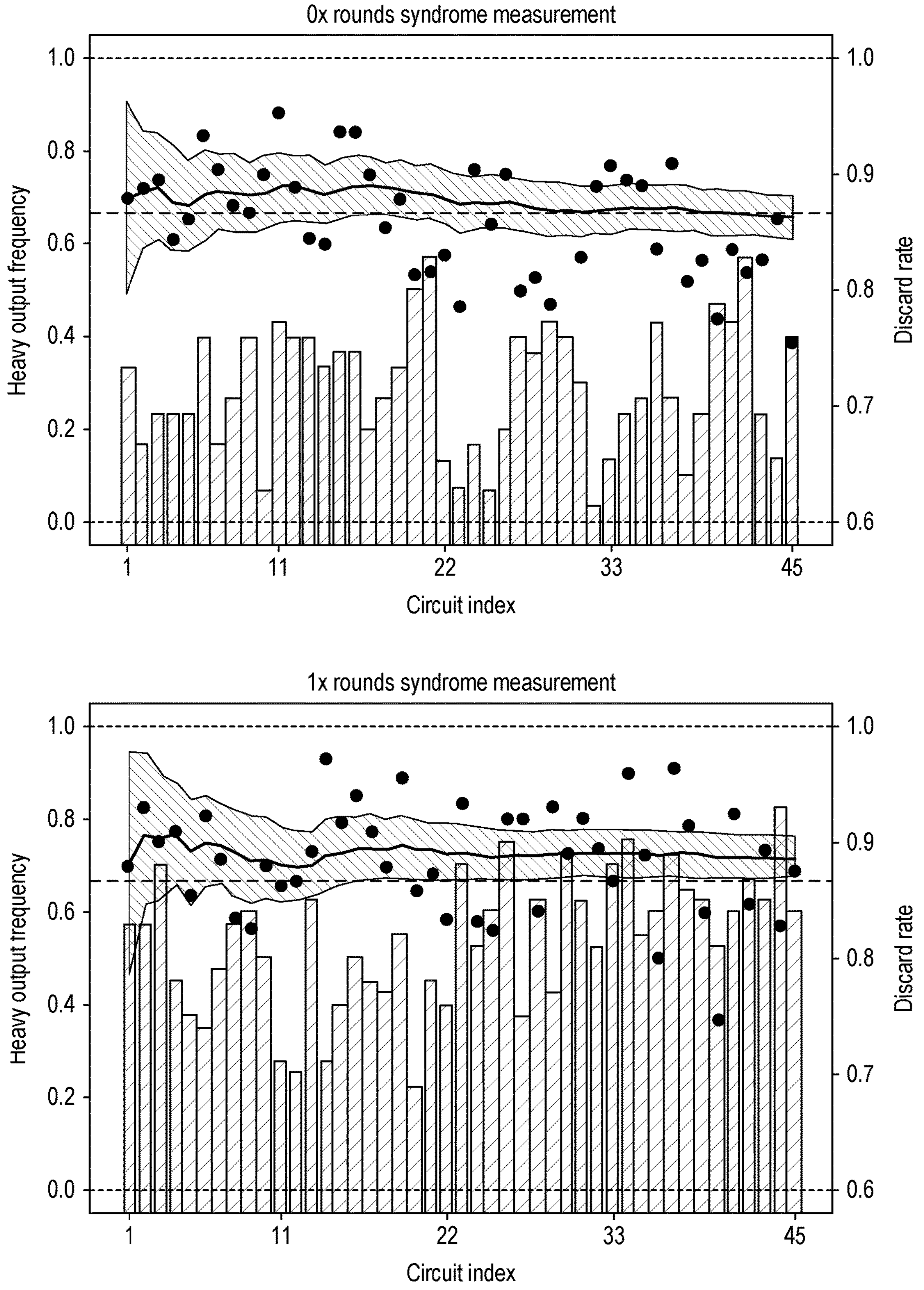
FIG. 19 is a graph of experimental results from an example of the test of FIG. 15.
Figure 19:
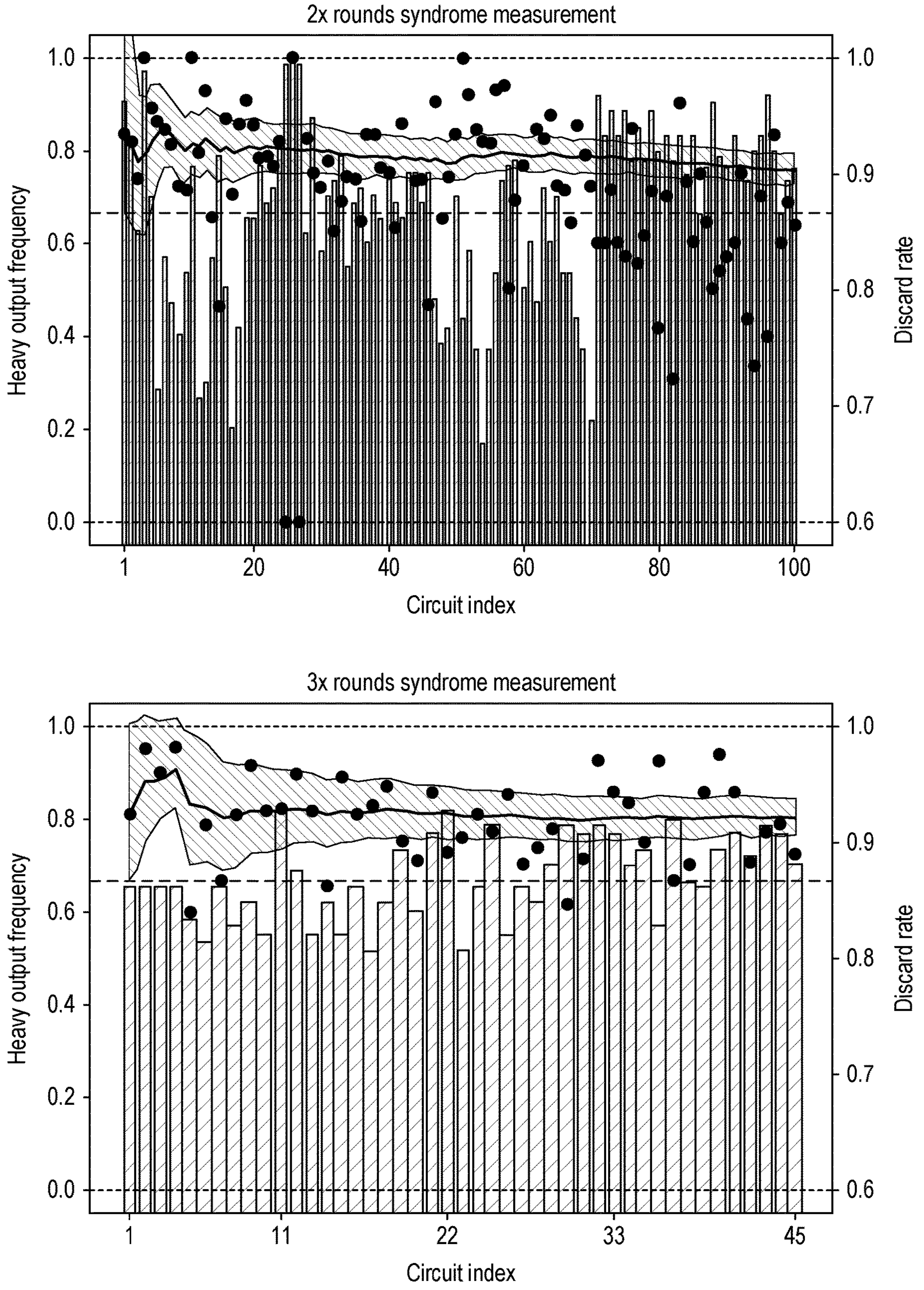

FIG. 19 shows additional experimental results showing the heavy output frequency of individual Quantum Volume (QV) circuits for 0×, 1×, 2× and 3× syndrome measurements. In each panel, the left axes (drawn in red) plots the heavy output frequency of each circuit after discarding, as well as the cumulative mean and its bootstrapped bounds. The passing threshold 2/3 is indicated with a dashed line, as well as 0 and 1 being highlighted with dotted lines. The right axes (plotted as blue bars) shows the number of shots retained after discarding. Experiments with Ox syndrome measurements used 75 shots, with 1× syndrome measurement used 100 shots, and with 2× and 3× syndrome measurements used 150 measurement shots.

Encoding the QV Circuits

Once expressed using single and two-qubit logical rotations the QV circuit can be directly translated into its physical form, using Eqs. (a)-(l). This logical circuit is then combined with initialisation and measurement instruction sets. We note that due to the structure of the Iceberg code, where all single-qubit logical X rotations involve the physical qubit t and all single-qubit logical Z rotations involve the physical b, the compiled physical circuit does no longer present the parallel form of the logical QV circuit.

Syndrome measurements are inserted between equally sized chunks of the QV instruction set. When doing this we do not respect the layered structure of the QV circuit, meaning the syndrome measurement circuits may be inserted inside a QV layer. However, we must be careful not to break up logical operations, e.g. to insert a syndrome measurement between the Hadamards and $MS_{ij}(\theta)$ gate of $\exp(-i\theta X_iX_j/2)=(H_iH_j)MS_{ij}(\theta)(H_iH_j)$.

The final executable circuits for the k=8 logical QV test act on 12 physical qubits and have circuit depths of ~700 up to over 1000 depending on the number of syndrome measurements, including up to ~350 two-qubit gates.

Additional Experimental Details and Results

Circuits are initially constructed in the gateset: {H, S, $S^\dagger$, CNOT, MS(θ)}, following the construction of the initialisation, syndrome measurement and final measurement circuits given in FIG. 1 as well as the construction of the encoded QV circuits described previously. These circuits are then compiled into the native gateset of the Quantinuum hardware [25] using the TKET compiler [44].

Our experiments were run with 0×, 1×, 2×, 3× syndrome measurements. For Ox rounds of syndrome measurement we carry out 75 repeats of the experiment (measurement shots), for 1× we use 100 shots and for 2× and 3× we perform 150 shots. We vary the number of shots with the goal of retaining 10-20 shots of each circuit after discards, while the discard rate varies with the number of syndrome measurements.

All circuits run to the end, with the outcome of mid-circuit error detection measurements being saved to classical syndrome registers. When the measurement results have been collected we discard results where an error was detected. The results that are not discarded are post-processed to reconstruct the values of the logical operators $\overline{Z}_i$ as well as $S_Z$. If $S_Z$ detects an error we discard the result. The remaining decoded results are processed to compute the heavy output frequency.

The heavy output frequencies for each individual QV circuit with 0×, 1×, 2× and 3× syndrome measurements are shown in FIG. 19, as well as the discard rates. The reported cumulative averages are calculated using Qiskit [33]. The bounds shown are calculated using the bootstrapped approach described in Ref. [32].

Example: Encoding and Compiling a QPE Circuit with [6, 4, 2] Code

The invention has been used in a demonstration of quantum phase estimation (QPE) with quantum error detection, on a Quantinuum System H1 ion-trapping quantum computer. A Bayesian approach to QPE was combined with a [k+2, k, 2] quantum error detection code to provide encoding and compiling of a QPE circuit. This offers protection with limited quantum resources, by discarding erroneous executions of quantum circuits. For instance, the [k+2, k, 2] code for even k is a stabilizer code whose code space is stabilized by $X^{\otimes k+2}$ and $Z_{\otimes K+2}$ (dubbed Iceberg code in [45]). In this work, we employ the code with k=4, i.e. [6, 4, 2] code, to encode four logical qubits. The logical qubits and two redundant physical qubits, denoted by L:={1, 2, 3, 4} and A:={$a_X$, $a_Z$}, form the six-qubit code on T:=L∪A. More concretely, the three-qubit QPE circuit, with one dummy qubit appended, is encoded into six physical qubits. Note that the notation $a_X$ ($a_Z$) is equivalent to top t (bottom b) representing the qubit for encoding. We introduce two additional ancillary qubits to carry out fault-tolerant state preparation, syndrome extractions, and final measurement, leading to eight qubits used in total. We denote the two stabilizers by $$S_X := \bigotimes_{i\in T} X_i \text{ and } S_Z := \bigotimes_{i\in T} Z_i,$$

and their simultaneous eigenstates associated with the eigenvalue +1 define the four-qubit logical space. Reading out −1 upon measuring {$S_X$, $S_Z$} signals the errors that do not commute with the stabilizer operators, and thus such circuit executions are discarded. The undetectable errors by stabilizer (syndrome) measurements lead to logical errors disturbing the encoded system.

The encoded quantum states are manipulated by logical Pauli operators $$\overline{X}_i := X_iX_{a_X}, \overline{Z}_i := Z_iZ_{a_Z}, \text{ for } i \in L,$$

which commute with the stabilizers and obey $$\{\overline{X}_i, \overline{Z}_i\} = \{\overline{X}_i, \overline{Z}_i\} = 0 \text{ for } i \neq j.$$

All the logical operations are compiled to the universal logical gate set, which, in the form of physical gates, is given by [45]

$$\{R_{P_iP_j}(\theta) \mid i, j \in T, i \neq j, P \in \{X, Y, Z\}\},$$

where we have defined a Pauli exponential operator $R_P(\vartheta):=e^{-1\vartheta P/2}$ for a rotation angle $\vartheta$ and a Pauli operator P. The structure of the encoded QPE circuit is shown below, with a description of explicit compilation of each component.

The encoded circuit starts with encoding the initial state. The two extra ancillary qubits are dedicated to performing the fault-tolerant initialization. We split the logical operation $(\text{ctrl-u})^s$ into $\lfloor s/f \rfloor$ blocks, where $s \in \mathbb{N}$ and $f \in \mathbb{N}$ denote the number of repetitions and the frequency of the syndrome measurements, respectively. Application of each block is followed by a syndrome measurement to inspect whether the encoded state is stabilized by $\{S_X, S_Z\}$. As soon as one syndrome measurement is read off as −1, the circuit execution is aborted. Furthermore, we insert a stabilizer $S_X$ in the middle of each block, which acts on the code space as the identity. However, it suppresses the coherent physical errors in the form of a single-qubit Z rotation accumulating in time. After all the logical unitary operations are performed, we make a final measurement to ensure that both stabilizers are measured to 1 and read off logical Pauli expectation values.

Some features of the code are adapted to exploit the capability of Quantinuum's H1-1 trapped-ion computer [45]. The state preparation, syndrome measurements, and projective measurement are performed in a fault-tolerant manner. While non-fault-tolerantly implemented, a logical operator $R_{P_iP_j}(\theta)$ is, up to single-qubit Clifford gates, compiled to a single Mølmer-Sørensen MS gate, $R_{Z_iZ_j}(\theta)$ which is natively implemented on the trapped-ion computer with the gate infidelity $\sim 2\times 10^{-3}$. As such, Quantinuum's high-fidelity MS gate operations combined with the all-to-all connectivity is expected to lead to logical circuit executions with a low logical error rate. Lastly, the Quantinuum device is equipped with conditional exit, a functionality to immediately abort the circuit execution conditioned on classical registers. Thanks to this feature, one can save runtime by discarding calculations as soon as a syndrome measurement detects errors without running the remaining calculations in vain.

Figure 20:
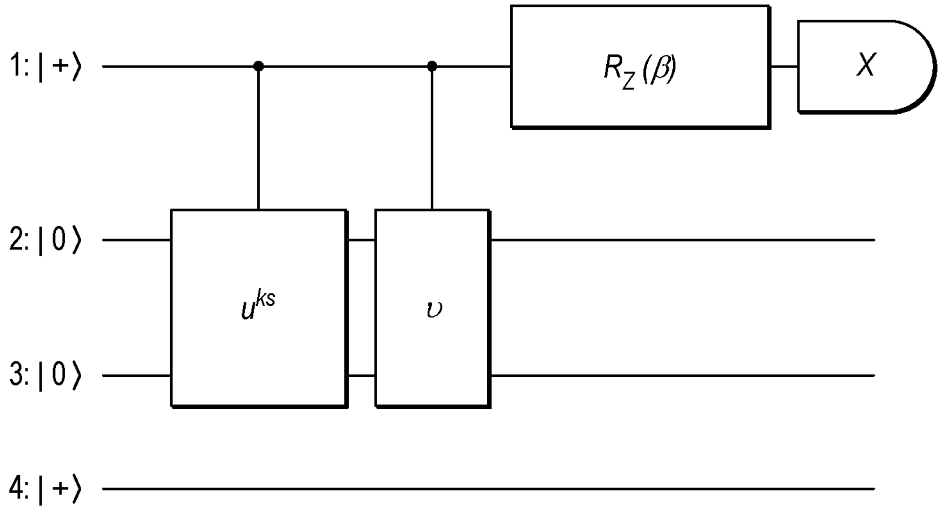
FIG. 20 illustrates an unencoded Quantum Fourier Transform (QFT)-free QPE circuit.

In the example of a Bayesian approach to QPE, measurement outcomes are generated from the unencoded QPE circuit shown in FIG. 20.

Figure 21:
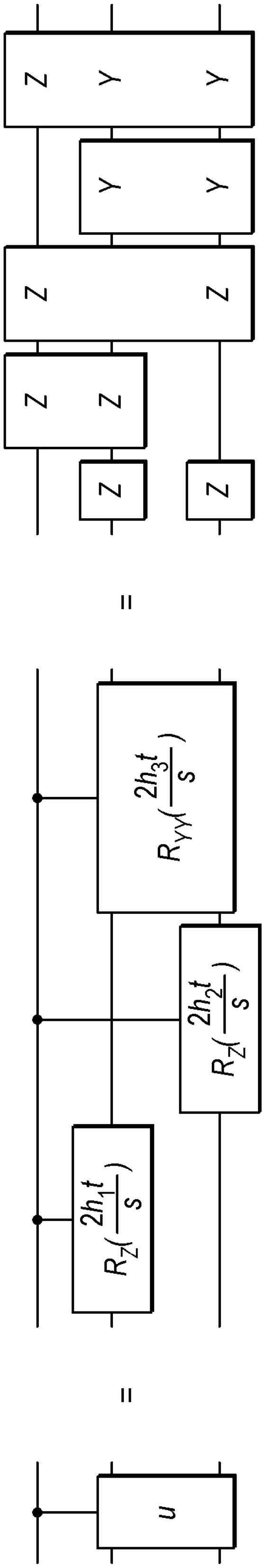
FIG. 21 illustrates the control unitary operation u of FIG. 20.
Figure 25:
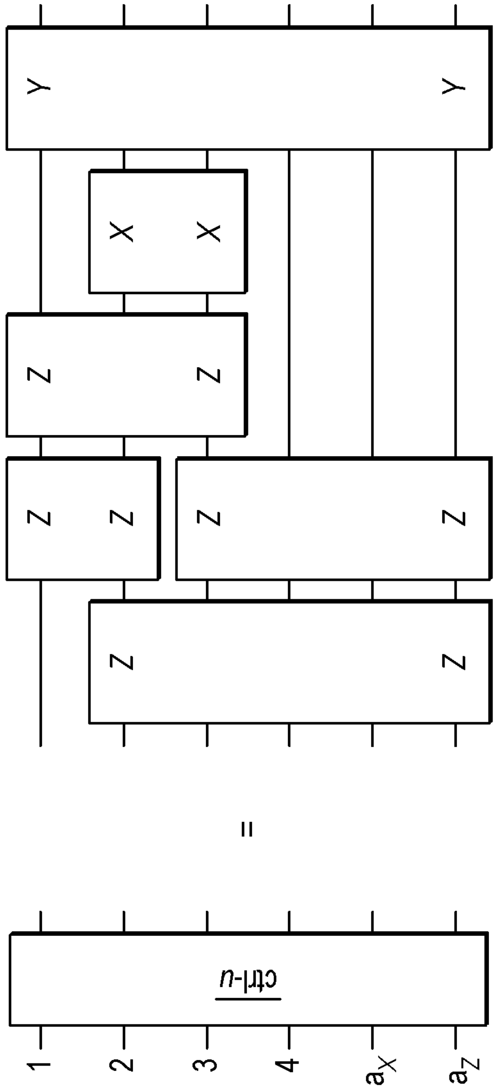
FIG. 25 illustrates the encoded form of FIG. 24.

Note the fourth qubit is absent in the experiments with unencoded circuits, but it is added so that the circuit is encoded with [k+2, k, 2] code, where k has to be even. The reason why it is initialized to $|+\rangle$ is explained below with reference to FIG. 25. The control unitary operations are given in FIG. 21 and FIG. 22.

In the second equality of each equation, we note that a controlled Pauli exponential operator ctrl-$R_P(\vartheta)$ can be decomposed into a product of Pauli exponential operators using the following identity, $$ctrl_i - R_{P_j}(\theta) = R_{P_j}(\theta/2) R_{Z_iP_j}(-\theta/2).$$

Also, we introduced the shorthand notation of a ctrl-$R_P(\vartheta)$ gate that shows only the Pauli operator P on the exponent with the angle $\vartheta$ suppressed. Note that $R_Z(\beta)$ in FIG. 20 can be absorbed into the ctrl-v in FIG. 22.

Figure 23:
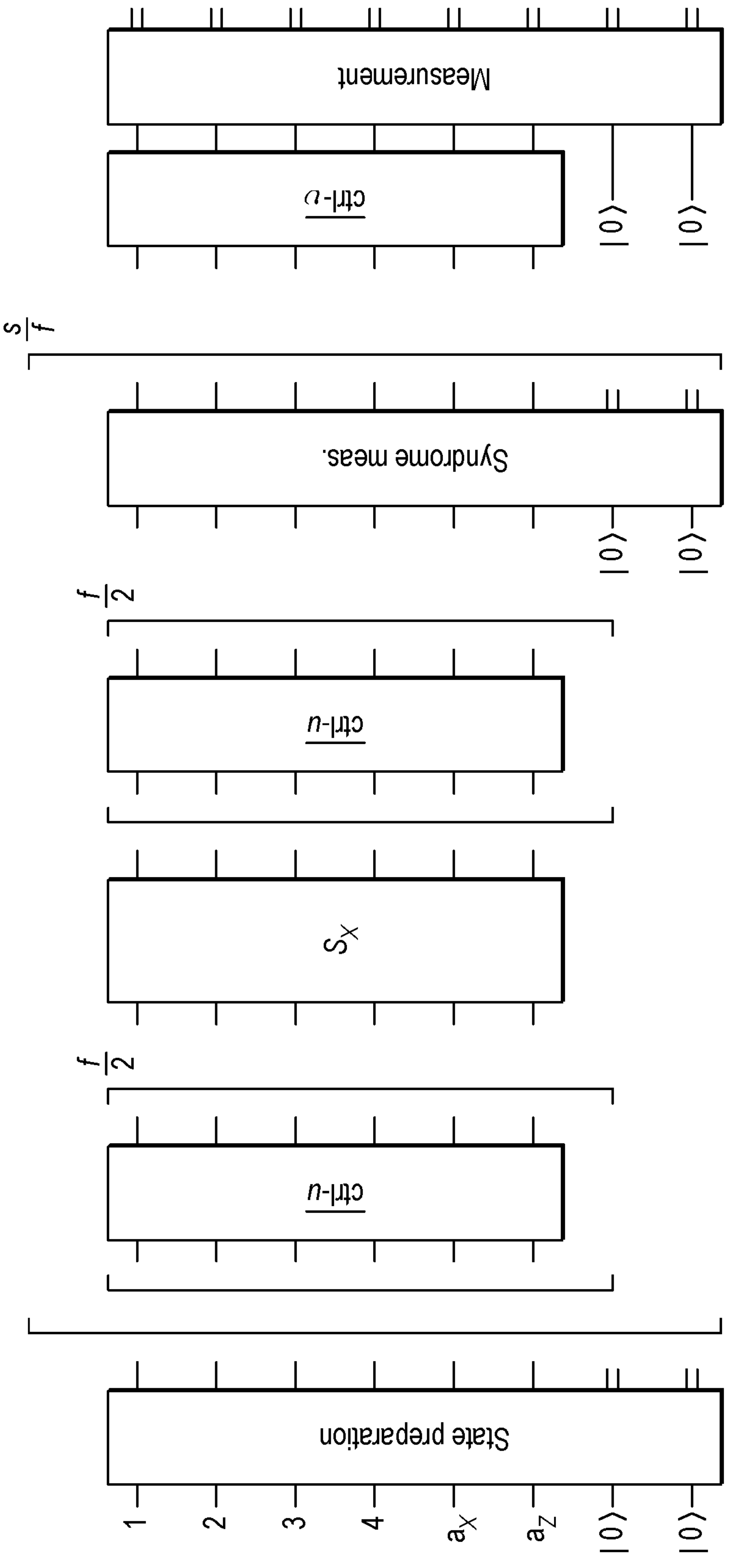
FIG. 23 is a sketch of an entire encoded QPE circuit.

We discuss each component of the encoded circuit in FIG. 20 and how they are compiled to the universal gates. The encoded circuit is expressed in FIG. 23

Fault-tolerant protocols are known for state preparation, syndrome measurements, and final measurement in [k+2, k, 2] QED code. Here, we briefly comment on each primitive by referring to the preceding literature for further details.

The Hartree-Fock state $|{+}00{+}\rangle$ (exact ground state $e^{-i\alpha Y_2 X_3/2}$ with $\alpha=-0.07113$) is fault tolerantly encoded following Appendix D of [46]. It uses 9 two-qubit ($R_{ZZ}$) gates and 2 ancillary qubits to detect faults.

The fault-tolerant syndrome measurements of $S_X$ and $S_Z$ are performed in the form proposed in [45], which uses 12 two-qubit gates and 2 ancillary qubits.

The final measurement is based on the implementation in [46]. The primitive consists of syndrome measurement of $S_Z$ stabilizer and destructive X measurements on all the physical qubits. If no errors are detected, the measurement outcomes are post-processed to extract the observable. There are 8 two-qubit gates and 2 ancillary qubits in the measurement circuit.

Figure 22:
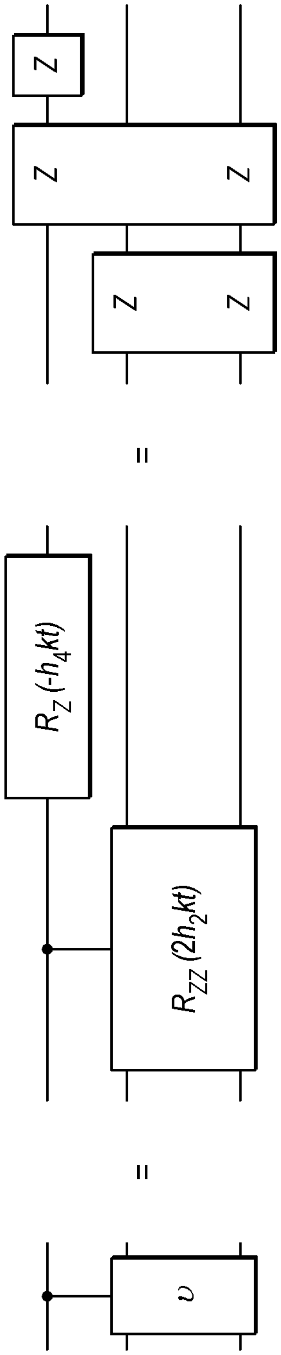
FIG. 22 illustrates the control unitary operation v of FIG. 20.
Figure 24:
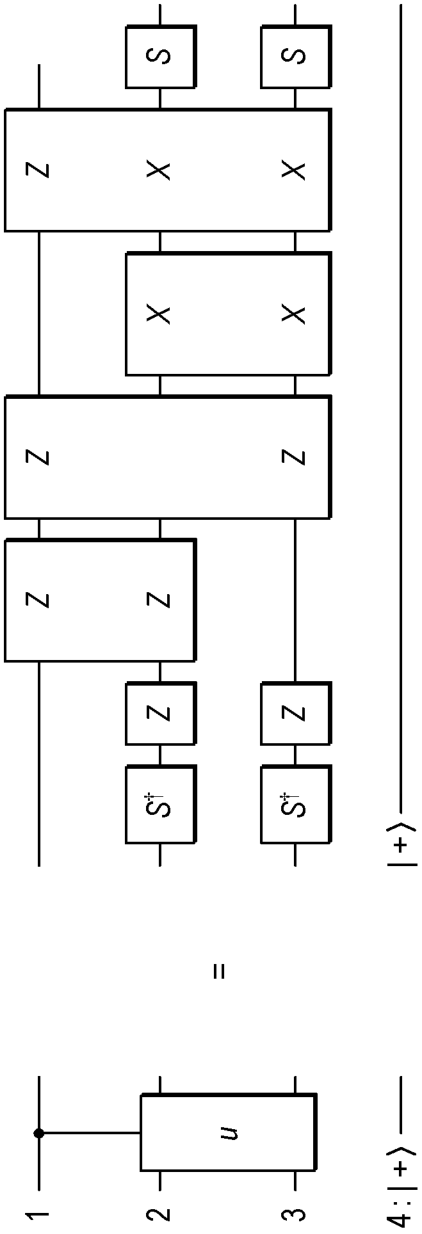
FIG. 24 illustrates compiling the control unitary operation u of FIG. 21 to logical gates.

Converting ctrl-v in FIG. 22 to ctrl-v and compile it to logical gates is straightforward. We focus on how to compile ctrl-u. For FIG. 24, we first pull out $I\otimes S\otimes S\otimes I$ and $I\otimes S^{554}\otimes S^{\dagger}\otimes I$ in FIG. 21 to convert Y operators into X operators which simplifies the compilation. The operators $I\otimes S\otimes S\otimes I$ and $I\otimes S^{554}\otimes S^{\dagger}\otimes I$ can be absorbed either in the initial state or the final state without affecting the measurement outcome. For FIG. 25, we use $\overline{X}_i := X_i X_{a_X}$, $\overline{Z}_i := Z_i Z_{a_2}$, for $i \in L$, to find the encoded form of FIG. 24 where the stabilizer condition $S_x=S_z=1$ is used to reduce the weight of Pauli operators. Furthermore, we exploit the fourth logical qubit initialize to $|+\rangle$, which implies $X_4=1$. Then, we find the reduction of the operator, $$\overline{Z}_1\overline{X}_2\overline{X}_3 = Z_1 Z_{a_x} X_2 X_3 = -Y_1 Y_{a_z} S_Z \overline{X}_4,$$

which is $Y_1 Y_{a_z}$ in the subspace such that $S_x=S_z=X_4=1$ holds. Thus, we have compiled all the logical operators to two-qubit Pauli exponential operators to obtain FIG. 25, which are readily implemented by the native two-qubit gate, $R_{ZZ}(\vartheta)$ and single-qubit gates. Each ctrl-u in FIG. 25 uses 6 two-qubit gates.

This provides a compilation method for an odd number of logical qubits and is enabled by including a redundant qubit d and exploiting the state of the qubit d for circuit optimisation, as shown below. Using the same terminology as earlier in this patent specification, the error detection function includes one or more products of pairs of the k-qubits:

$$X_q^L = X_t X_q \text{ for } q = 1, \ldots, k \tag{a}$$

$$X_q^L X_{q'}^L = X_q X_{q'} \text{ for } q \neq q' \text{ where } q, q' \in \{1, \ldots, k\} \tag{b}$$

$$\bigotimes_{r\neq q} X_r^L = X_q X_b \text{ for } q = 1, \ldots, k \text{ with } |+\rangle_d^L \tag{c}$$

$$\bigotimes_{r=1}^k X_r^L = X_t X_b \text{ with } |+\rangle_d^L \tag{d}$$

$$Z_q^L = Z_b Z_q \text{ for } q = 1, \ldots, k \tag{e}$$

$$Z_q^L Z_{q'}^L = Z_q Z_{q'} \text{ for } q \neq q' \text{ where } q, q' \in \{1, \ldots, k\} \tag{f}$$

$$\bigotimes_{r\neq q} Z_r^L = Z_t Z_q \text{ for } q = 1, \ldots, k \text{ with } |0\rangle_d^L \tag{g}$$

$$\bigotimes_{r=1}^k Z_r^L = Z_t Z_b \text{ with } |0\rangle_d^L \tag{h}$$

$$Y_q^L Y_{q'}^L = Y_q Y_{q'} \text{ for } q \neq q' \text{ where } q, q' \in \{1, \ldots, k\} \tag{i}$$

$$X_q^L \otimes_{r\neq q} Z_r^L = Y_t Y_q \text{ for } q = 1, \ldots, k \text{ with } |0\rangle_d^L \tag{j}$$

$$Z_q^L \otimes_{r\neq q} X_r^L = Y_q Y_b \text{ for } q = 1, \ldots, k \text{ with } |+\rangle_d^L \tag{k}$$

$$(-1)^{1+(k+1)/2} \otimes_{r=1}^k Y_r^L = Y_t Y_b \text{ with } |+i\rangle_d^L \tag{l}$$

BIBLIOGRAPHY OF LITERATURE RELATING TO QUANTUM COMPUTING

[Chao2020] R. Chao, and B. W. Reichardt, 2020. Flag fault-tolerant error correction for any stabilizer code. *PRX Quantum,* 1 (1), p. 010302.

[1] Gottesman, D. An introduction to quantum error correction and fault-tolerant quantum computation (2009). URL https://arxiv.org/abs/0904.2557.

[2] Lidar, D. A. & Brun, T. A. Quantum Error Correction (Cambridge University Press, 2013).

[3] Orzel, C. Quantum Simulation. 2399-2891 (IOP Publishing, 2017). URL https://dx.doi.org/10.1088/978-0-7503-1516-6.

[4] Harrow, A. W., Hassidim, A. & Lloyd, S. Quantum algorithm for linear systems of equations. Phys. Rev. Lett. 103, 150502 (2009). URL https://link.aps.org/doi/10.1103/PhysRevLett.103.150502.

[5] Shor, P. Algorithms for quantum computation: discrete logarithms and factoring. In Proceedings 35th Annual Symposium on Foundations of Computer Science, 124-134 (1994).

[6] Gidney, C. & Eker°a, M. How to factor 2048 bit RSA integers in 8 hours using 20 million noisy qubits. Quantum 5, 433 (2021). URL https://doi.org/10.22331/q-2021-04-15-433.

[7] Allcock, J. et al. The prospects of monte carlo antibody loop modelling on a fault-tolerant quantum computer. Frontiers in Drug Discovery 2 (2022). URL https://www-.frontiersin.org/articles/10.3389/fddsv.2022.908870.

[8] Chen, Z. et al. Exponential suppression of bit or phase errors with cyclic error correction. Nature 595, 383-387 (2021). URL https://doi.org/10.1038% 2Fs41586-021-03588-y.

[9] Ryan-Anderson, C. et al. Realization of real-time fault-tolerant quantum error correction. Phys. Rev. X 11, 041058 (2021). URL https://link.aps.org/doi/10. 1103/PhysRevX.11.041058.

[10] Acharya, R. & et al. Suppressing quantum errors by scaling a surface code logical qubit (2022). URL https://arxiv.org/abs/2207.06431.

[11] Postler, L. et al. Demonstration of fault-tolerant universal quantum gate operations. Nature 605, 675-680 (2022). URL https://doi.org/10.1038% 2Fs41586-022-04721-1.

[12] Ryan-Anderson, C. et al. Implementing fault-tolerant entangling gates on the five-qubit code and the color code (2022). URL https://arxiv.org/abs/2208.01863.

[13] Suzuki, Y., Endo, S., Fujii, K. & Tokunaga, Y. Quantum error mitigation as a universal error reduction technique: Applications from the nisq to the faulttolerant quantum computing eras. PRX Quantum 3, 010345 (2022). URL https://link.aps.org/doi/10. 1103/PRXQuantum.3.010345.

[14] Cirac, J. I. & Zoller, P. Goals and opportunities in quantum simulation. Nature physics 8, 264-266 (2012). URL https://doi.org/10.1038/nphys2275.

[15] Harrow, A. W. & Montanaro, A. Quantum computational supremacy. Nature 549, 203-209 (2017). URL https://doi.org/10.1038% 2Fnature23458.

[16] Lund, A. P., Bremner, M. J. & Ralph, T. C. Quantum sampling problems, BosonSampling and quantum supremacy. npj Quantum Information 3 (2017). URL https://doi.org/10.1038% 2Fs41534-017-0018-2.

[17] Knill, E. Fault-tolerant postselected quantum computation: Schemes (2004). URL https://arxiv.org/abs/quant-ph/0402171.

[18] Knill, E. Fault-tolerant postselected quantum computation: Threshold analysis (2004). URL https://arxiv. org/abs/quant-ph/0404104.

[19] Urbanek, M., Nachman, B. & de Jong, W. A. Error detection on quantum computers improving the accuracy of chemical calculations. Phys. Rev. A 102, 022427 (2020). URL https://link.aps.org/doi/10. 1103/PhysRevA.102.022427.

[20] Schindler, P. et al. A quantum information processor with trapped ions. New Journal of Physics 15, 123012 (2013). URL https://doi.org/10.1088/1367-2630/15/12/123012.

[21] Bruzewicz, C. D., Chiaverini, J., McConnell, R. & Sage, J. M. Trapped-ion quantum computing: Progress and challenges. Applied Physics Reviews 6, 021314 (2019). URL https://doi.org/10.1063/1.5088164.

[22] Grassl, M., Beth, T. & R"otteler, M. On optimal quantum codes. International Journal of Quantum Information 02, 55-64 (2004). URL https://doi.org/10.1142/S0219749904000079.

[23] Molmer, K. & Sorensen, A. Multiparticle entanglement of hot trapped ions. Phys. Rev. Lett. 82, 1835-1838 (1999). URL https://link.aps.org/doi/10. 1103/PhysRevLett.82.1835.

[24] Quantinuum H1-2. https://www.quantinuum.com/Jul. 27-Oct. 8, 2022.

[25] Pino, J. M. et al. Demonstration of the trapped-ion quantum ccd computer architecture. Nature 592, 209-213 (2021).

[26] Linke, N. M. et al. Fault-tolerant quantum error detection. Science Advances 3, e1701074 (2017). URL https://www.science.org/doi/abs/10. 1126/sciadv.1701074.

[27] Hines, J. et al. Demonstrating scalable randomized benchmarking of universal gate sets (2022). URL https://arxiv.org/abs/2207.07272.

[28] Proctor, T. et al. Scalable randomized benchmarking of quantum computers using mirror circuits (2021). URL https://arxiv.org/abs/2112.09853.

[29] Chao, R. & Reichardt, B. W. Quantum error correction with only two extra qubits. Phys. Rev. Lett. 121, 050502 (2018). URL https://link.aps.org/doi/10. 1103/PhysRevLett.121.050502.

[30] Proctor, T., Rudinger, K., Young, K., Nielsen, E. & Blume-Kohout, R. Measuring the capabilities of quantum computers. Nature Physics 18, 75-79 (2022).

[31] Cross, A. W., Bishop, L. S., Sheldon, S., Nation, P. D. & Gambetta, J. M. Validating quantum computers using randomized model circuits. Phys. Rev. A 100, 032328 (2019). URL https://link.aps.org/doi/10. 1103/PhysRevA.100.032328.

[32] Baldwin, C. H., Mayer, K., Brown, N. C., Ryan-Anderson, C. & Hayes, D. Re-examining the quantum volume test: Ideal distributions, compiler optimizations, confidence intervals, and scalable resource estimations. Quantum 6, 707 (2022). URL https://doi.org/10. 22331/q-2022-05-09-707.

[33] Qiskit Python Package (v0.37.0) https://pypi.org/project/qiskit/(2022).

[34] Itoko, T. & Imamichi, T. Scheduling of operations in quantum compiler (2020). URL https://arxiv.org/abs/2011.04936.

[35] Gokhale, P. et al. Quantum fan-out: Circuit optimizations and technology modeling (2020). URL https://arxiv.org/abs/2007.04246.

[36] Lao, L. & Browne, D. E. 2qan: A quantum compiler for 2-local qubit hamiltonian simulation algorithms (2021). URL https://arxiv.org/abs/2108.02099.

[37] Nannicini, G., Bishop, L. S., Gunluk, O. & Jurcevic, P. Optimal qubit assignment and routing via integer programming (2021). URL https://arxiv.org/abs/2106.06446.
[38] Stricker, R. et al. Experimental deterministic correction of qubit loss. Nature 585, 207-210 (2020).
[39] Farhi, E., Goldstone, J. & Gutmann, S. A quantum approximate optimization algorithm (2014). URL https://arxiv.org/abs/1411.4028.
[40] Amaro, D. et al. Filtering variational quantum algorithms for combinatorial optimization. Quantum Science and Technology 7, 015021 (2022). URL https://doi.org/10.1088/2058-9565/ac3e54.
[41] Benedetti, M., Lloyd, E., Sack, S. & Fiorentini, M. Parameterized quantum circuits as machine learning models. Quantum Science and Technology 4, 043001 (2019). URL https://doi.org/10.1088/2058-9565/ab4eb5.
[42] van de Wetering, J. Constructing quantum circuits with global gates. New Journal of Physics 23, 043015 (2021). URL https://doi.org/10.1088/1367-2630/abf1b3.
[43] Sivarajah, S. et al. t|ket): a retargetable compiler for NISQ devices. Quantum Science and Technology 6, 014003 (2020). URL https://doi.org/10.1088/20589565/ab8e92.
[44] Pytket Python Package (v1.4.1) https://pypi. org/project/pytket/, Pytket-Quantinuum extension (v0.4.0) https://pypi.org/project/pytket-quantinuum/, Pytket-Qiskit extension (v0.26.0) https://pypi.org/project/pytket-qiskit/ (2022).
[45]] C. N. Self, M. Benedetti, and D. Amaro, Protecting Expressive Circuits with a Quantum Error Detection Code (2022), arXiv: 2211.06703 [quant-ph].
[46]] R. Chao and B. W. Reichardt, Quantum error correction with only two extra qubits, Phys. Rev. Lett. 121, 050502 (2018)

The invention claimed is:

1. A computer-implemented method of performing a quantum computing operation comprising a target unitary operation with quantum error detection, the method comprising:

obtaining a finite gate decomposition approximation of the target unitary operation for a quantum circuit of k logical qubits;

converting, using a quantum error detection code, the finite gate decomposition for a quantum circuit of k logical qubits into a set of instructions for performing a quantum circuit of n physical qubits wherein n=k+2 and wherein the n physical qubits comprise k physical qubits corresponding to the k logical qubits and a physical qubit t and a physical qubit b, wherein the quantum error detection code encodes the k logical qubits into the n physical qubits and wherein the quantum error detection code is a stabiliser code comprising two stabilisers on the physical qubits:

$$S_X = X_t X_b \bigotimes_{q=1}^{k} X_q$$

$$S_Z = Z_t Z_b \bigotimes_{q=1}^{k} Z_q$$

and the logical qubit operators, $\overline{Z}_J$ of the code are defined by:

$$\overline{X_q} = X_t X_q \text{ for } q = 1, \ldots, k$$

$$\overline{Z_q} = Z_b Z_q \text{ for } q = 1, \ldots, k$$

wherein $\overline{X_q}$, $\overline{Z_q}$ are the Pauli X and Z single logical qubit operators on logical qubit q, wherein the set of instructions comprises a plurality of blocks of instructions and wherein each block of instructions comprises at least one instruction for performing at least one quantum gate on a n qubit quantum circuit by a quantum computing system;

performing, by the quantum computing system, fault-tolerant initialisation of a logical state of k logical qubits using an n qubit quantum circuit and a first ancilla qubit and the quantum error detection code;

performing, by the quantum computing system, each instruction block of the plurality of instruction blocks on the quantum circuit of n physical qubits;

after each instruction block, performing, by the quantum computing system, a fault-tolerant syndrome measurement of the $S_Z$ stabiliser and the $S_X$ stabiliser on the n physical qubits using the first ancilla and a second ancilla respectively;

after all instruction blocks of the plurality of instruction blocks have been applied to the n physical qubits, performing, by the quantum computing system, a fault-tolerant state measurement, using the first and second ancilla, of each logical operator, $\overline{Z_q}\forall q=\{1, \ldots, k\}$, by measuring the n physical qubits; and during any of the fault-tolerant steps of performing initialisation, syndrome measurement or state measurement, to discard the computer results and to restart the computation of the quantum operation based on any measurement of the first or second ancilla indicating a fault.

2. The method of claim 1 wherein the quantum computing system is a trapped-ion quantum computer with all-to-all connectivity between qubits.

3. The method of claim 1 wherein the finite gate decomposition is composed of unitary gates from a universal gate set comprising gates which can be encoded onto the physical qubits using one or more two-qubit Mølmer-Sørensen gates and up to four Clifford group gates.

4. The method of claim 3 wherein the universal gate set comprises only single-qubit logical rotations, two-qubit logical rotations and global rotations on k or k−1 logical qubits.

5. The method of claim 1 wherein the fault-tolerant measurement of each logical operator $\overline{Z_q}\forall q$ is combined with the last syndrome measurement after the last instruction block has been applied by measuring the $S_X$ stabiliser on the n physical qubits and measuring the n physical qubits and post-processing the results to decode the $S_Z$ stabiliser and each logical operator $\overline{Z_q}$ and the quantum computing system is configured to discard the computer results and to restart the computation of the quantum operation based on the decoded $S_z$ stabiliser value indicating a fault during the fault tolerant steps.

6. A system for performing a quantum computing operation comprising a target unitary operation with quantum error detection, the system comprising:

a classical computing system;

a quantum computing system, wherein the quantum computing system comprises n primary physical qubits and first and second ancilla qubits, wherein the n physical qubits which comprise of k physical qubits and a physical qubit t and a physical qubit b, and wherein the quantum computing system is configured to implement a quantum circuit on the n physical qubits comprising the k physical qubits and the physical qubit t and the physical qubit b, using the first and second ancilla qubits;

and wherein the classical computing system is configured to:

obtain a finite gate decomposition approximation of the target unitary operation for a quantum circuit of k logical qubits;

convert, using an quantum error detection code, the finite gate decomposition for a quantum circuit of k logical qubits into a set of instructions for performing a quantum circuit of the n physical qubits of the quantum computing system, wherein the quantum error detection code encodes the k logical qubits into the n physical qubits and the quantum error detection code is a stabiliser code comprising two stabilisers on the physical qubits:

$$S_X = X_t X_b \bigotimes_{q=1}^{k} X_q$$

$$S_Z = Z_t Z_b \bigotimes_{q=1}^{k} Z_q$$

and the logical qubits operators, $\overline{Z}_J$ of the code are defined by:

$$\overline{X_q} = X_t X_q \text{ for } q = 1, \ldots, k$$

$$\overline{Z_q} = Z_b Z_q \text{ for } q = 1, \ldots, k$$

wherein $\overline{X_q}$, $\overline{Z_q}$ are the Pauli X and Z single logical qubit operators on logical qubit q, wherein the set of instructions comprises a plurality of blocks of instructions and wherein each block of instructions comprises at least one instruction for performing at least one quantum gate on a n qubit quantum circuit by the quantum computing system; and transmit the set of instructions to the quantum computing system;

and wherein the quantum computing system is configured to:

receive the set of instructions:

perform fault-tolerant initialisation of a logical state of k logical qubits using an n qubit quantum circuit and a first ancilla and the quantum error detection code;

perform each instruction block of the plurality of instruction blocks on the quantum circuit of n physical qubits;

after each instruction block, perform a fault-tolerant syndrome measurement of the $S_Z$ stabiliser and the $S_X$ stabiliser on the n physical qubits using the first ancilla and a second ancilla respectively;

after all instruction blocks of the plurality of instruction blocks have been applied to the n physical qubits, perform, a fault-tolerant state measurement, using the first and second ancilla, of each logical operator $\overline{Z_q}\forall q=\{1, \ldots, k\}$ by measuring the n physical qubits; and to discard the computer results and to restart the computation of the quantum operation based on any measurement of the first or second ancilla indicating a fault during any of the fault tolerant steps of performing initialisation, syndrome measurement or state measurement.

7. The system of claim 6 wherein the quantum computing system is a trapped-ion quantum computer with all-to-all connectivity between qubits.

8. The system of claim 6 wherein the qubits of the quantum computing system comprise only the n physical qubits and two ancilla qubits.

9. The system of claim 6 wherein the finite gate decomposition is composed of unitary gates from a universal gate set comprising gates which can be encoded onto the physical qubits using only two-qubit Mølmer-Sørensen gates and up to four Clifford group gates and, optionally, the universal gate set comprises global rotations on k or k−1 logical qubits.

10. The system of claim 9 wherein the universal gate set comprises only single-qubit logical rotations, two-qubit logical rotations and global rotations on k or k−1 logical qubits.

11. The system of claim 6 wherein the quantum computing system is further configured to combine the fault-tolerant state measurement of each logical operator $\overline{Z_q}\forall q$ with the last syndrome measurement after the last instruction block has been applied by measuring the $S_X$ stabiliser on the n physical qubits and measuring the n physical qubits and to transmit the results to the classical computing system and the classical computing system is further configured to post-process the transmitted results to decode the $S_z$ stabiliser and each logical operator $\overline{Z_q}$ and to transmit an indication of the decoded $S_z$ stabiliser value to the quantum computing system, and wherein the quantum computing system is further configured to discard the computer results and to restart the computation based on the decoded $S_z$ stabiliser value indicating a fault.

12. A quantum computing system for performing a quantum operation comprising a target unitary operation with quantum error detection, wherein the quantum computing system comprises n primary physical qubits and first and second ancilla qubits, the primary physical qubits comprising k physical qubits and a physical qubit t and a physical qubit b, and wherein the quantum computing system is configured to implement a quantum circuit on the n physical qubits comprising the k physical qubits and the physical qubit t and the physical qubit b, using the first and second ancilla qubit, and wherein the quantum computing system is configured to:

receive a set of instructions from a classical computing system that converts, using a quantum error detection code, a finite gate decomposition for a quantum circuit of k logical qubits into a quantum circuit of n physical qubits of the quantum computing system, wherein the quantum error detection code encodes k logical qubits into the n physical qubits and is a stabiliser code comprising two stabilisers on the physical qubits, wherein the set of instructions comprises a plurality of blocks of instructions and wherein each block of instructions comprises at least one instruction for performing at least one quantum gate on a n qubit quantum circuit by the quantum computing system;

perform fault-tolerant initialisation of a logical state of k logical qubits using an n qubit quantum circuit and a first ancilla and the quantum error detection code;

perform each instruction block of the plurality of instruction blocks on the quantum circuit of n physical qubits;

after each instruction block, perform a fault-tolerant syndrome measurement of the $S_Z$ stabiliser and the $S_X$ stabiliser on the n physical qubits using the first ancilla and a second ancilla respectively;

after all instruction blocks of the plurality of instruction blocks have been applied to the n physical qubits, perform a fault-tolerant state measurement, using the first and second ancilla, of each logical operator $\overline{Z_q}\forall q=\{1, \ldots, k\}$ by measuring the n physical qubits;

and wherein the quantum computing system is configured to discard the computer results and to restart the computation of the quantum operation during any of the fault tolerant steps of performing initialisation, syndrome measurement or state measurement based on any measurement of the ancilla indicating a fault.

13. The quantum computing system of claim 12, wherein the k logical qubits are encoded to an even number of physical qubits and wherein an odd number of logical qubits is encoded into an even number of physical qubits by providing a redundant qubit d, and wherein the state of the qubit d is used for circuit optimisation.

14. The quantum computing system of claim 12, wherein the ancilla qubits include X and Z qubits, wherein:

X is acting on all qubits $$S_X = X_t X_b \otimes_{Q=1}^{n} X_q;$$

and

Z is acting on all qubits $$S_Z = Z_t Z_b \otimes_{Q=1}^{n} Z_q.$$

15. The quantum computing system of claim 14, wherein the products of logical operators comprise one or more products of pairs of the k logical qubits as follows:

$$X_q^L = X_t X_q \text{ for } q = 1, \ldots, k \tag{a}$$

$$X_q^L X_{q'}^L = X_q X_{q'} \text{ for } q \neq q \text{ where } q, q' \in \{1, \ldots, k\} \tag{b}$$

$$\bigotimes_{r \neq q} X_r^L = X_q X_b \text{ for } q = 1, \ldots, k \text{ with } |+\rangle_d^L \tag{c}$$

$$\bigotimes_{r=1}^{k} X_r^L = X_t X_b \text{ with } |+\rangle_d^L \tag{d}$$

$$Z_q^L = Z_b Z_q \text{ for } q = 1, \ldots, k \tag{e}$$

$$Z_q^L Z_{q'}^L = Z_q Z_{q'} \text{ for } q \neq q' \text{ where } q, q' \in \{1, \ldots, k\} \tag{f}$$

$$\bigotimes_{r \neq q} Z_r^L = Z_t Z_q \text{ for } q = 1, \ldots, k \text{ with } |0\rangle_d^L \tag{g}$$

$$\bigotimes_{r=1}^{k} Z_r^L = Z_t Z_b \text{ with } |0\rangle_d^L \tag{h}$$

$$Y_q^L Y_{q'}^L = Y_q Y_{q'} \text{ for } q \neq q' \text{ where } q, q' \in \{1, \ldots, k\} \tag{i}$$

$$X_q^L \otimes_{r \neq q} Z_r^L = Y_t Y_q \text{ for } q = 1, \ldots, k \text{ with } |0\rangle_d^L \tag{j}$$

$$Z_q^L \otimes_{r \neq q} X_r^L = Y_q Y_b \text{ for } q = 1, \ldots, k \text{ with } |+\rangle_d^L \tag{k}$$

$$(-1)^{1+k/2} \otimes_{r=1}^{k} Y_r^L = Y_t Y_b \text{ with } |+i\rangle_d^L \tag{l}$$

16. The quantum computing system of claim 12 wherein the at least one quantum gate on the n qubit quantum circuit of each instruction block comprises either a two-qubit Mølmer-Sørensen gate or a single qubit Clifford group gate.

* * * * *